United States Patent
Nakamura et al.

(10) Patent No.: US 8,238,356 B2
(45) Date of Patent: Aug. 7, 2012

(54) COMMUNICATION SYSTEM AND ACCESS GATEWAY APPARATUS

(75) Inventors: Hitomi Nakamura, Kokubunji (JP);
Yuichiro Katsu, Yokohama (JP);
Norihisa Matsumoto, Fuchu (JP);
Masashi Yano, Kawasaki (JP);
Masahiro Takatori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 12/572,586

(22) Filed: Oct. 2, 2009

(65) Prior Publication Data

US 2010/0020812 A1     Jan. 28, 2010

(30) Foreign Application Priority Data

Oct. 2, 2008   (JP) .................... 2008-257131

(51) Int. Cl.
*H04L 12/28* (2006.01)
*H04L 12/56* (2006.01)
(52) U.S. Cl. ........ 370/401; 370/351; 370/352; 370/353; 370/354; 370/356; 370/389; 370/400
(58) Field of Classification Search .................. None
See application file for complete search history.

(56) References Cited

U.S. PATENT DOCUMENTS

| | | | |
|---|---|---|---|
| 7,050,416 B2 * | 5/2006 | Bichot et al. ................ | 370/338 |
| 2004/0008664 A1 * | 1/2004 | Takahashi et al. ............ | 370/351 |
| 2004/0037260 A1 * | 2/2004 | Kakemizu et al. ............ | 370/338 |
| 2005/0238171 A1 * | 10/2005 | Chen et al. .................... | 380/270 |
| 2007/0232301 A1 * | 10/2007 | Kueh ............................. | 455/433 |
| 2008/0137541 A1 * | 6/2008 | Agarwal et al. .............. | 370/241 |
| 2009/0129316 A1 * | 5/2009 | Ramanathan et al. ........ | 370/328 |

OTHER PUBLICATIONS

Milo Orsic; MMD Roaming-Dual anchor; $3^{rd}$ Generation Partnership Project2 "3GPPS"; Alcatel-Lucent; orsic@alcatel-lucent.com. May 14, 2007, pp. 1-2.
B. Sarikaya et al.; PMI Pv6 Route Optimization Protocol; draft-qin-net lmn-pmipro-00.txt; IETF; Network Working Group Internet-Draft; http://www.ietf.org/shadow.html; 2008; pp. 1-17.

* cited by examiner

*Primary Examiner* — Jae Y Lee
(74) *Attorney, Agent, or Firm* — Antonelli, Terry, Stout & Kraus, LLP.

(57) ABSTRACT

A communication system comprising a home server, an access gateway, and a policy server, wherein the policy server transmits, to the first access gateway, a link creation request for associating a communication path of the first terminal and a communication path of the second terminal; and the access gateway sets a fifth communication path which connects the first communication path and the third communication path upon receiving the link creation request, records information on the set fifth communication path in the communication path management information, and transmits the data from the first terminal via the first communication path to the second terminal via the fifth communication path and the third communication path based on the communication path management information.

15 Claims, 24 Drawing Sheets

150 SERVICE INFORMATION MANAGEMENT TABLE (PCRF12)

| SERVICE SESSION ID | FLOW INFORMATION | | | | |
|---|---|---|---|---|---|
| | 152A FLOW ID | 152B FLOW FILTER | 152C MEDIA TYPE | 152D BAND-WIDTH | ... |
| ax10d@CSCF11 | 1001 | FROM 192.168.0.100 TO 192.168.0.200 DST_PORT=1234 | AUDIO | 9.6 kb/s | | 150A
| | 1002 | FROM 192.168.0.200 TO 192.168.0.100 DST_PORT=5678 | AUDIO | 9.6 kb/s | | 150B
| ... | | | | | |

*Fig. 3A*

170 BEARER INFORMATION MANAGEMENT TABLE (PCRF12)

| 171 USER ID | 172 USER IP | 173 PGW ID | 174 SGW ID | 175 BEARER INFORMATION | | |
|---|---|---|---|---|---|---|
| | | | | 175A FLOW ID | 175B BEARER ID IN PGW | 175C BEARER ID IN SGW (LINK INFORMATION) |
| USER #1 | 192.168.0.100 | PGW21 | SGW42 | - | 7100 | 5100 | 170A
| | | | | 1001. 1002 | - | 5101 (CN72, 5201) | 170B
| USER #2 | 192.168.0.200 | PGW21 | SGW42 | - | 7200 | 5200 | 170C
| | | | | 1001. 1002 | - | 5201 (MN71, 5101) | 170D
| ... | | | | | | |

Fig. 3B

190 UPLINK BEARER MANAGEMENT TABLE (SGW42, SGW52)

| USER ID | BEARER ID | FLOW FILTER | QoS/ BILLING INFOR- MATION | RECEIVING TUNNEL INFORMATION | TRANSMITTING TUNNEL INFORMATION | |
|---|---|---|---|---|---|---|
| USER #1 | 5100 | FROM 192.168.0.100 TO ANY | HIGH | Dst=LOCAL TEID=xx | Dst=PGW GRE KEY=xx | 190A |
| | 5101 | FROM 192.168.0.100 TO 192.168.0.200 dst_port=1234 | HIGH 9.6kb/s METERED BILLING | Dst=LOCAL TEID=xx | REDIRECT TO DOWNLINK 5201 | 190B |
| ... | | | | | | |
| USER #2 | 5200 | FROM 192.168.0.200 TO ANY | HIGH | Dst=LOCAL TEID=xx | Dst=PGW GRE KEY=xx | 190C |
| | 5201 | FROM 192.168.0.200 TO 192.168.0.100 dst_port=5678 | HIGH 9.6kb/s METERED BILLING | Dst=LOCAL TEID=xx | REDIRECT TO DOWNLINK 5101 | 190D |
| ... | | | | | | |

*Fig. 4*

210 DOWNLINK BEARER MANAGEMENT TABLE (SGW42, SGW52)

| USER ID | BEARER ID | FLOW FILTER | QoS/ BILLING INFOR- MATION | RECEIVING TUNNEL INFORMATION | TRANSMITTING TUNNEL INFORMATION | |
|---|---|---|---|---|---|---|
| USER #1 | 5100 | FROM ANY TO 192.168.0.100 | HIGH | Dst=LOCAL GRE KEY=xx | Dst=eNB43C TEID=xx | 210A |
|  | 5101 | FROM 192.168.0.200 TO 192.168.0.100 DST_PORT=5678 | HIGH 9.6KB/S METERED BILLING | REDIRECT FROM UPLINK 5201 | Dst=eNB43C TEID=xx | 210B |
| ... |  |  |  |  |  |  |
| USER #2 | 5200 | FROM ANY TO 192.168.0.200 | HIGH | Dst=LOCAL GRE KEY=xx | Dst=eNB43A TEID=xx | 210C |
|  | 5201 | FROM 192.168.0.100 TO 192.168.0.200 DST_PORT=1234 | HIGH 9.6KB/S METERED BILLING | REDIRECT FROM UPLINK 5101 | Dst=eNB43A TEID=xx | 210D |
| ... |  |  |  |  |  |  |

Fig. 5

230 TERMINAL FLOW INFORMATION MANAGEMENT TABLE (PCRF12)

| USER ID | FLOW INFORMATION | | | | | | |
|---|---|---|---|---|---|---|---|
| | 232A | 232B | 232C | 232D | 232E | | |
| | FLOW ID | DIRECTION OF FLOW | FLOW FILTER | PRIORITY | BAND-WIDTH | ... | |
| USER #1 | 2001 | UPLINK | FROM 192.168.0.100 TO 192.168.0.200 dst_port=1234 | HIGH | 9.6kb/s | | 230A |
| | 2002 | DOWNLINK | FROM 192.168.0.200 TO 192.168.0.100 dst_port=5678 | HIGH | 9.6kb/s | | 230B |
| USER #2 | 2003 | UPLINK | FROM 192.168.0.200 TO 192.168.0.100 dst_port=5678 | HIGH | 9.6kb/s | | 230C |
| | 2004 | DOWNLINK | FROM 192.168.0.100 TO 192.168.0.200 dst_port=1234 | HIGH | 9.6kb/s | | 230D |
| ... | | | | | | | |

*Fig. 21*

COMMUNICATION SYSTEM AND ACCESS GATEWAY APPARATUS

CLAIM OF PRIORITY

The present application claims priority from Japanese patent application JP 2008-257131 filed on Oct. 2, 2008, the content of which is hereby incorporated by reference into this application.

BACKGROUND OF THE INVENTION

The present invention relates to a route control method in a packet exchange type mobile communication system, and in particular, to a method of redirecting user traffic within an access gateway if users accommodated in a same access gateway or neighboring access gateways communicate with each other.

In a 3.9 generation mobile communication network, represented by LTE (Long Term Evolution) of 3GPP (3rd Generation Partnership Project), all networks are changed to use IP, and therefore, telephone services conventionally provided by circuit switching networks are provided on IP networks.

The IP network of the LTE is comprised of an access network and a service network which is independent on accesses.

The LTE access network is comprised of base stations (eNB) which perform wireless communications, MMEs (Mobility Management Entities) which perform the location control and the connection control for terminals, The SGWs (Serving Gateway) which distribute user traffic to service networks, and PGWs (Packet data network Gateways) which transfers traffic from the SGWs to service networks and collects billing data.

On the other hand, in the case of a telephone service, the access independent service network of the LTE is a call control network referred to as an IMS (IP Multimedia Subsystem). In the IMS, an SIP (Session Initiation Protocol) server called CSCF (Call Session Control Function) performs association of telephone numbers with IP addresses of terminals, and management of call sessions. Moreover, the PGW which connects an LTE access network to the IMS has functions to transfer call control signal from terminals to the CSCF and voice signals between the terminals, and to collect billing data (number of transferred packets, transfer data volume, etc.).

The MME and the SGW of the LTE access network are set up in places near base stations for association with the base stations. In contrast, the PGW which connects between the LTE access network and the IMS is set up at the core network side near the service network for association with the service network. Therefore, in the case where terminals are accommodated in a same SGW in particular, there is a problem in that transfer delay occurs by transferring voice traffic to the PGW for the IMS, and therefore, the bandwidth of the core network is narrowed.

As an example for a method of transferring voice traffic without routing the PGW, there is a "Dual Anchoring Approach" which uses different. IP addresses by distinguishing between the IMS call control communication and the voice communication (for example, refer to an article, "3GPP2 X30-20070514-028R1 MMD Roaming—Dual anchor"). In other words, this method uses IP addresses (Home Address) assigned by the PGW for the IMS for the IMS call control communication, and on the other hand, the IP address assigned by the LTE access network (MME, SGW, or local PGW set up in a place near MME or SGW) is used for voice communication. Thereby, the voice packets route locally in the LTE access network, and therefore, it is possible to reduce the transfer delay.

With respect to other methods, there is a method called "Proxy Mobile IPv6 Route Optimization" which establishes a data path directly between Mobile Access Gateways (equivalent to the SGWs in LTE) which accommodate terminals (for example, refer to an article, "IETF draft-qin-netlmm-pmipro-00 PMIPv6 Route Optimization"). However, the article, "IETF draft-qin-netlmm-pmipro-00 PMIPv6 Route Optimization" describes a method for setting the data path of the Proxy Mobile IPv6 Route Optimization but it does not mention about a trigger Of the setting or a method for determining the subject to be set.

SUMMARY OF THE INVENTION

However, in the above Dual Anchoring Approach, the terminal itself which does not have knowledge of a network configuration determines which are IP addresses to use properly, and therefore, there is a problem in that it is not always the optimal route. For example, in the case where the communication counterpart of a terminal is a meeting server set up in an IMS, although it is appropriate to use the Home Address assigned by IMS for the terminal, it is possible that the IP address assigned by a local PGW may be used without care.

Moreover, in Proxy Mobile IPv6 Route Optimization, although it specifies the method to set the path between the SGWs, the trigger of the setting and the determination method of the subject to be set are not made clear, and there is a problem in that it does not take into consideration the consistency with the QoS/billing control.

The present invention is accomplished in view of the above problems, and an objective of the present invention is to set automatically the shortest data path that takes into consideration the QoS/billing control at the network side, without notifying a terminal which assigned IP addresses use.

A representative example of this invention is as follows. A communication system comprising a home server which connects a terminal and a service network, an access gateway which connects the terminal and the home server, and a policy server which controls the access gateway, wherein the access gateway includes at least a first access gateway; a first communication path is set between a first terminal and the first access gateway, a second communication path is set between the first access gateway and the home server, a third communication path is set between a second terminal and the first access gateway; and a fourth communication path is set between the first access gateway and the home server; the first terminal communicates with the second terminal via the first communication path, the second communication path, the fourth communication path and the third communication path; the first access gateway manages communication path management information including information on the communication paths of each terminal; the policy server transmits, to the first access gateway, a link creation request for associating a communication path of the first terminal and a communication path of the second terminal; and the first access gateway sets a fifth communication path which connects the first communication path and the third communication path upon receiving the link creation request, records information on the set fifth communication path in the communication path management information, and transmits the data from the first terminal via the first communication path to the second terminal via the fifth communication path and the third communication path based on the communication path management information.

According to the present invention, a terminal can set a shortest data path that takes priority into consideration at the network side, without being conscious which assigned IP addresses use.

BRIEF DESCRIPTION OF THE DRAWINGS

The present invention can be appreciated by the description which follows in conjunction with the following figures, wherein:

FIG. 3A is a diagram illustrating an example of a configuration of a service information management table included in the PCRF according to the first embodiment of the present invention;

FIG. 3B is a diagram illustrating an example of a configuration of a bearer information management table included in the PCRF according to the first embodiment of the present invention;

FIG. 4 is a diagram illustrating an example of a configuration of an uplink bearer management table managed by the SGWs according to the first embodiment of the present invention;

FIG. 5 is a diagram illustrating an example of a configuration of a downlink bearer management table managed by the SGWs according to the first embodiment of the present invention;

FIG. 21 is a diagram illustrating an example of a configuration of a terminal flow information management table which managed by the PCRF according to the second embodiment of the present invention;

DETAILED DESCRIPTION OF THE PREFERRED EMBODIMENT

Hereafter, embodiments of the present invention will be described with reference to the drawings. Although the embodiments described below explain 3GPP LTE as an example, the present invention is not limited to this system but can be applied also to various radio communication systems, such as WiMAX or WLAN.

First Embodiment

Figure 1:
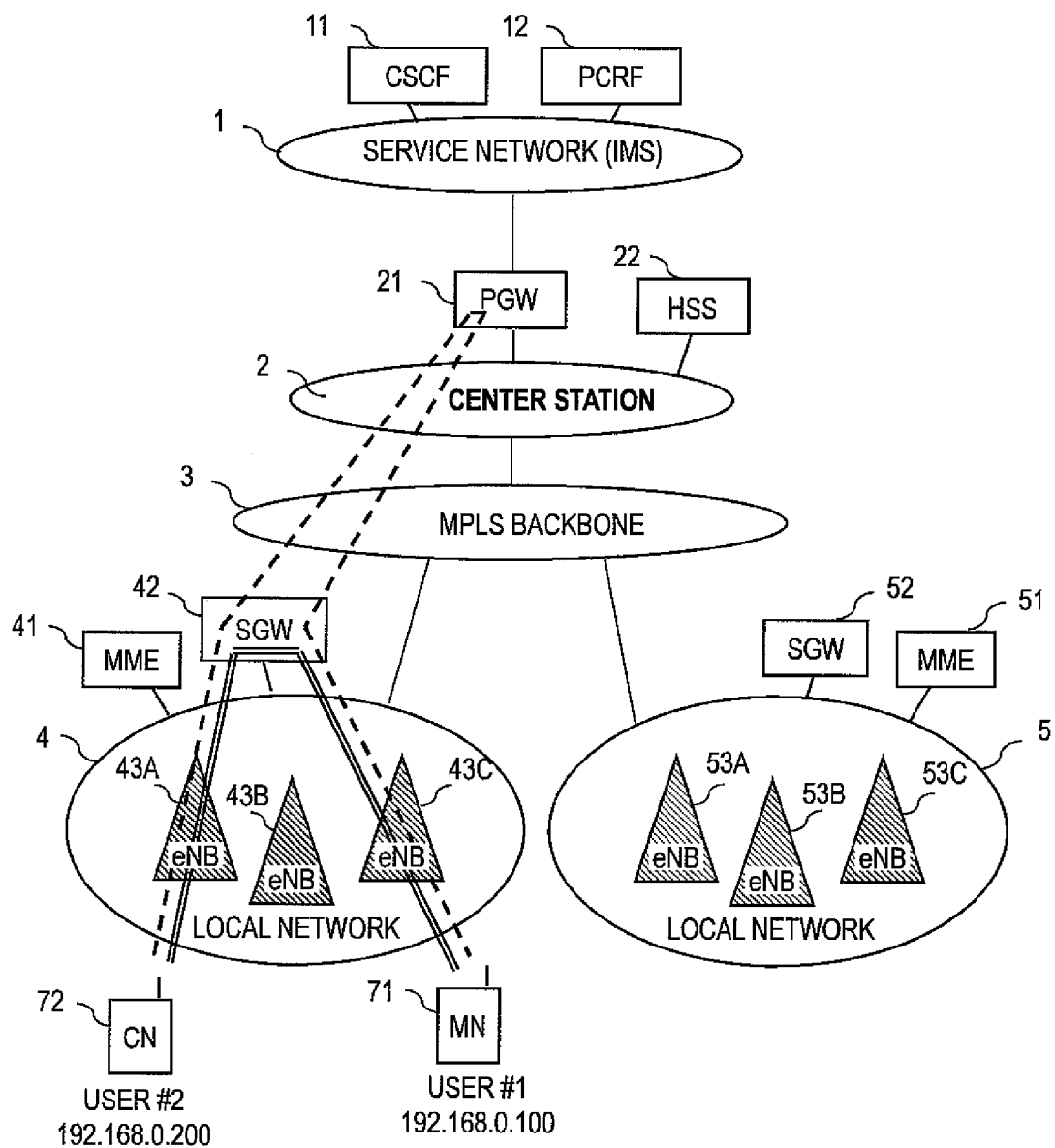
FIG. 1 is a diagram illustrating an example of a configuration of a communication network according to a first embodiment of a present invention.

FIG. 1 is a diagram illustrating an example of a configuration of a communication network according to the first embodiment of the present invention.

The communication network is comprised of a service network (IMS) 1, a center station 2, a MPLS backbone 3, a local network 4, 5, a CSCF 11, a PCRF 12, a PGW 21, a HSS (Home Subscriber Server) 22, MMEs 41, 42, SGWs 42, 52, eNBs 43A-43C, and eNBs 53A-53C.

A MN (Mobile Node) 71 and a CN (Correspond Node) 72 are user terminals having a wireless communication function, and are connected to a carrier network via the eNB 43 (43A-43C) or the eNB 53 (53A-53C).

The carrier network is comprised of local networks 4 and 5 which are formed on the basis of areas, such as prefectures, a center station 2 which aggregates nationwide local networks, an MPLS backbone 3 which connects between the local network 4 and the local network 5, and the local networks 4, 5 and the center station 2, and a service network 1 which is located on the basis of services.

The local network 4 is connected to the eNB 43 (43A-43C) which performs wireless communication with terminals, the MME 41 which performs move management and connection control for terminals, and the SGW 42 which distribute user traffic from terminals to service networks. It is the same for the local network 5. It is noted that the eNB 43 (43A-43C) and the eNB 53 (53A-53C) are referred to as eNBs 43, 53 unless distinguishing those in particular.

The HSS 22 which manages user authentication information and the PGW 21 which transmit user traffic to service networks are connected to the center station 2.

In this embodiment, the service network 1 is an IMS which performs telephone call control. The service network 1 is connected to a call control server (CSCF) 11, and a policy server (PCRF) 12 which controls PGW 21 and the SGWs 42, 52 based on the service information transmitted from the CSCF 11.

As shown in FIG. 1, conventionally, the voice data transmitted from the MN 71 is transmitted to the CN 72 via a path shown with a dashed line. That is, the conventional voice data path always routes the PGW 21.

In accordance with the first embodiment of the invention, the voice data path becomes a path shown in double line by the processes which will be described later (refer to FIG. 6). That is, voice data is transmitted so that it redirects within the SGW 42 without routing the PGW 21.

Figure 2A:
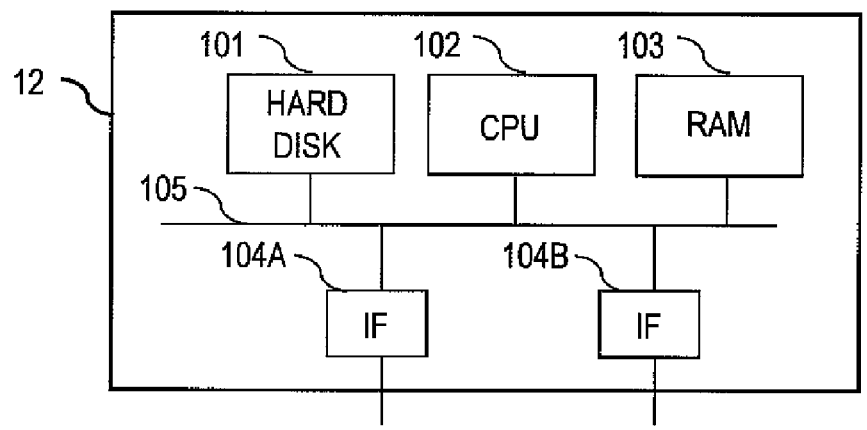
FIG. 2A is a block diagram illustrating a device configuration of a PCRF according to the first embodiment of the present invention.

FIG. 2A is a block diagram illustrating a device configuration of the PCRF 12 according to the first embodiment of the present invention.

The PCRF 12 is comprised of a hard disk 101, a CPU 102, a RAM 103 and IFs 104A, 104B, and these are mutually connected through a bus 105.

The program for achieving the function of the PCRF 12 is stored in the hard disk 101, and is expanded in the RAM 103 at the time of starting of the device. The CPU 102 executes the program expanded in the RAM 103.

Figure 2B:
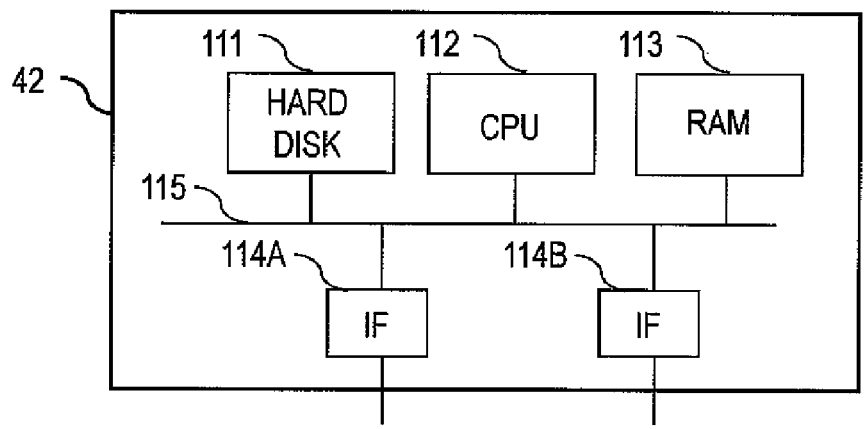
FIG. 2B is a block diagram illustrating a device configuration of SGWs according to the first embodiment of the present invention.

FIG. 2B is a block diagram illustrating a device configuration of the SGWs 42, 52 according to the first embodiment of the present invention. The SGWs 42, 52 are comprised of a hard disk 111, a CPU 112, a RAM 113 and IFs 114A, 114B, and these are mutually connected through a bus 115.

The program for achieving the function of the SGWs 42, 52 is stored in the hard disk 111, and is expanded in the RAM 113 at the time of starting of the device. The CPU 112 executes the program expanded in the RAM 113.

FIG. 3A is a diagram illustrating an example of a configuration of a service information management table 150 included in the PCRF 12 according to the first embodiment of the present invention.

The service information management table 150 manages service information transmitted from the CSCF 11. The service information is information which indicates what kind of communication the voice data uses for transmission between the terminals. It is noted that the service information includes not only the voice data but also the information related to other services.

The service information management table 150 includes the service session ID 151 and the flow information 152. The service session ID 151 stores an identifier which identifies a service session uniquely. Moreover, the flow information 152 includes the flow ID 152A, the flow filter 152B, the media type 152C, and the bandwidth 152D as information of the flow belonging to a service session.

The Flow ID 152A stores an identifier which identifies a flow uniquely.

The flow filter 152B stores information for identifying a flow. Specifically, the flow filter 152B stores an IP address and a port number of the node used for the communication.

The media type 152C stores the type of the media of a flow. For example, if the media type 152C is "audio", it indicates voice communication. The bandwidth 152D stores a value indicating the bandwidth which the flow is using. For example, the bandwidth 152D stores the transmission data amount per second.

With reference to FIG. 3A, an entry 150A and an entry 150B are created in the flow information 152.

FIG. 3B is a diagram illustrating an example of a configuration of a bearer information management table 170 included in the PCRF 12 according to the first embodiment of the present invention.

The bearer information management table 170 manages the bearer information transmitted from the PGW 21 and the SGWs 42, 52. The bearer information is information related to the bearer used in order to transfer a service flow.

The bearer information management table 170 includes the user ID 171, the user IP 172, the PGW ID 173, the SGW ID 174, and the bearer information 175.

The user ID 171 stores identifiers for identifying the terminals uniquely. In the example shown in FIG. 1, "USER #1" is assigned to the user ID 171 for MN 71, and "USER #2" is assigned to the user ID 171 for CN 72.

The user IP 172 stores IP addresses assigned to the terminals. In the example shown in FIG. 1, "192.168.0.100" is assigned to the user IP for the MN 71, and "192.168.0.200" is assigned to the user IP 172 for the CN 72.

The PGW ID 173 stores the IP address which is assigned to the PGW 21 and which is routed when transferring voice data.

The SGW ID 174 stores the IP address which is assigned to the SGWs 42, 52 which is routed when transferring voice data.

The bearer information 175 stores information related to the bearers set in the SGWs 42, 52, and the PGW 21. Specifically, it includes the flow ID 175A, the intra-PGW bearer ID 175B, and the intra-SGW bearer ID 175C.

The flow ID 175A stores identifiers for identifying the flows transmitted using the set bearer. The flow ID 175A is the same as the flow ID 152A.

The intra-PGW bearer ID 175B stores identifiers for identifying the bearers set in the PGW 21. The intra-PGW bearer ID 175B is an identifier which the PGW 21 assigns.

The intra-SGW bearer ID 175C stores the identifier for identifying the bearer set in the SGWs 42, 52. The intra-SGW bearer ID 175C is an identifier which the SGWs 42, 52 assign.

In FIG. 3B, entries 170A-170D are created in the bearer information 175.

Conventionally, voice data, etc. are transmitted via the PGW 21, and therefore, the intra-PGW bearer ID 175B is information which is always set. However, in accordance with the first embodiment, voice data, etc. are transferred by processing which will be described later, without routing the PGW 21.

In this case, the intra-PGW bearer ID 175B is not set, and link information for a different bearer is stored in the intra-SGW bearer ID 175C. For example, the link information for a bearer is the bearer ID 192 (refer to FIG. 4).

In the example shown in FIG. 3B, as for the entries 170B and 170D, the intra-PGW bearer ID 175B is not set, and link information is set in the intra-SGW bearer ID 175C. Specifically, as for the link information set in the entry 170B, "5201" is set as the bearer ID 192 (refer to FIG. 4). Moreover, as for the link information set in the entry 170D, "5101" is set as the bearer ID 192 (refer to FIG. 4).

FIG. 4 is a diagram illustrating an example of a configuration of the uplink bearer management table 190 managed by the SGWs 42, 52 according to the first embodiment of the present invention.

The uplink bearer management table 190 manages information related to the bearers used when transferring data to the PGW 21 from the terminals (MN 71, CN 72).

The uplink bearer management table 190 includes the user ID 191, the bearer ID 192, the flow filter 193, the QoS/billing information 194, the receiving tunnel information 195, and the transmitting tunnel information 196.

The user ID 191 stores identifiers for identifying the terminals uniquely. The user ID 191 is the same as the user ID 171.

The bearer ID 192 stores identifiers for identifying the bearers uniquely.

The flow filter 193 stores information for identifying a flow. The flow filter 193 is the same as the flow filter 152B.

The QoS/billing information 194 stores information related to QoS (priority) and the billing method.

The receiving tunnel information 195 stores the tunnel information between the SGWs 42, 52, and the eNB 43, 53. Since the GTP (GPRS Tunneling Protocol) tunnel is used for communication between the SGWs 42, 52, and the eNB 43, 53 in the first embodiment, a destination node and TEID (Tunnel Endpoint ID) are set to the receiving tunnel information 195. It is noted that the receiving tunnel information 195 may store other information which is able to identify tunnels.

The transmitting tunnel information 196 stores tunnel information between the SGWs 42, 52, and the PGW 21. Since the PMIP tunnel (GRE (Generic Routing Encapsulation) tunnel) is used for the communication between the SGWs 42, 52 and the PGW 21, a destination node and GRE Key are set in the transmitting tunnel information 196. It is noted that the transmitting tunnel information 196 may store other information which is able to identify tunnels.

All of the voice data, etc., that are matched with the information stored in the flow filter 193 are transmitted using the bearer specified in the bearer ID 192.

In FIG. 4, entries 190A-190D are created for each bearer ID 192 in the uplink bearer management table 190. It is noted that the entry 190A and the entry 190C are bearers called "general-purpose bearers (default bearers)". A general-purpose bearer is a bearer immediately established at the time of network connection, and can transfer all of the user traffic from the terminals.

The entry 190B and the entry 190D are bearers called "dedicated bearers". A dedicated bearer is a bearer used when transmitting packets for specific services. For example, since a QoS guarantee is needed, the voice traffic of a telephone service is transferred using a dedicated bearer.

In the first embodiment, if data is transmitted without routing the PGW 21, the downlink bearer ID 212 (refer to FIG. 5) is set to the transmitting tunnel information 196.

FIG. 5 is a diagram illustrating an example of a configuration of the downlink bearer management table 210 managed by the SGWs 42, 52 according to the first embodiment of the present invention.

The downlink bearer management table 210 manages information related to the bearer used in a case of transferring data from the PGW 21 to the terminals (MN 71, CN 72).

The downlink bearer management table 210 contains the user ID 211, the bearer ID 212, the flow filter 213, the QoS/billing information 214, the receiving tunnel information 215, and the transmitting tunnel information 216.

The user ID 211, the bearer ID 212, the flow filter 213, and the QoS/billing information 214 are the same as the user ID 191, the bearer ID 192, the flow filter 193, and the QoS/billing information 194 shown in FIG. 4.

The receiving tunnel information 215 stores tunnel information between the SGWs 42, 52 and the PGW 21. In the first embodiment, a PMIP tunnel (GRE (Generic Routing Encapsulation) tunnel) is used for communication between the SGWs 42, 52 and the PGW 21, and therefore, the destination node and the GRE Key are set to the receiving tunnel information 215. It is noted that the receiving tunnel information 215 may store other information which is able to identify tunnels.

The transmitting tunnel information 216 stores tunnel information between the eNB 43, 53, and the SGWs 42, 52. In the first embodiment, since the GTP tunnel is used for communication between the eNB 43, 53, and the SGWs 42, 52, the destination node and the TEID are set to the transmitting tunnel information 216. It is noted that the transmitting tunnel information 216 may store other information which is able to identify tunnels.

In FIG. 5, entries 210A-210D are created for each bearer ID 212 in the downlink bearer management table 210. It is noted that the entry 210A and the entry 210C are bearers called general-purpose bearers (default bearers). The entry 210B and the entry 210D are bearers called dedicated bearers.

In the first embodiment, if data is transmitted without routing the PGW 21, the uplink bearer ID 192 is set to the receiving tunnel information 215.

Hereafter, a session establishment call flow in the case where the MN 71 and the CN 72 are accommodated in the SGW 42 will be described with reference to FIGS. 6-12.

Figure 6:
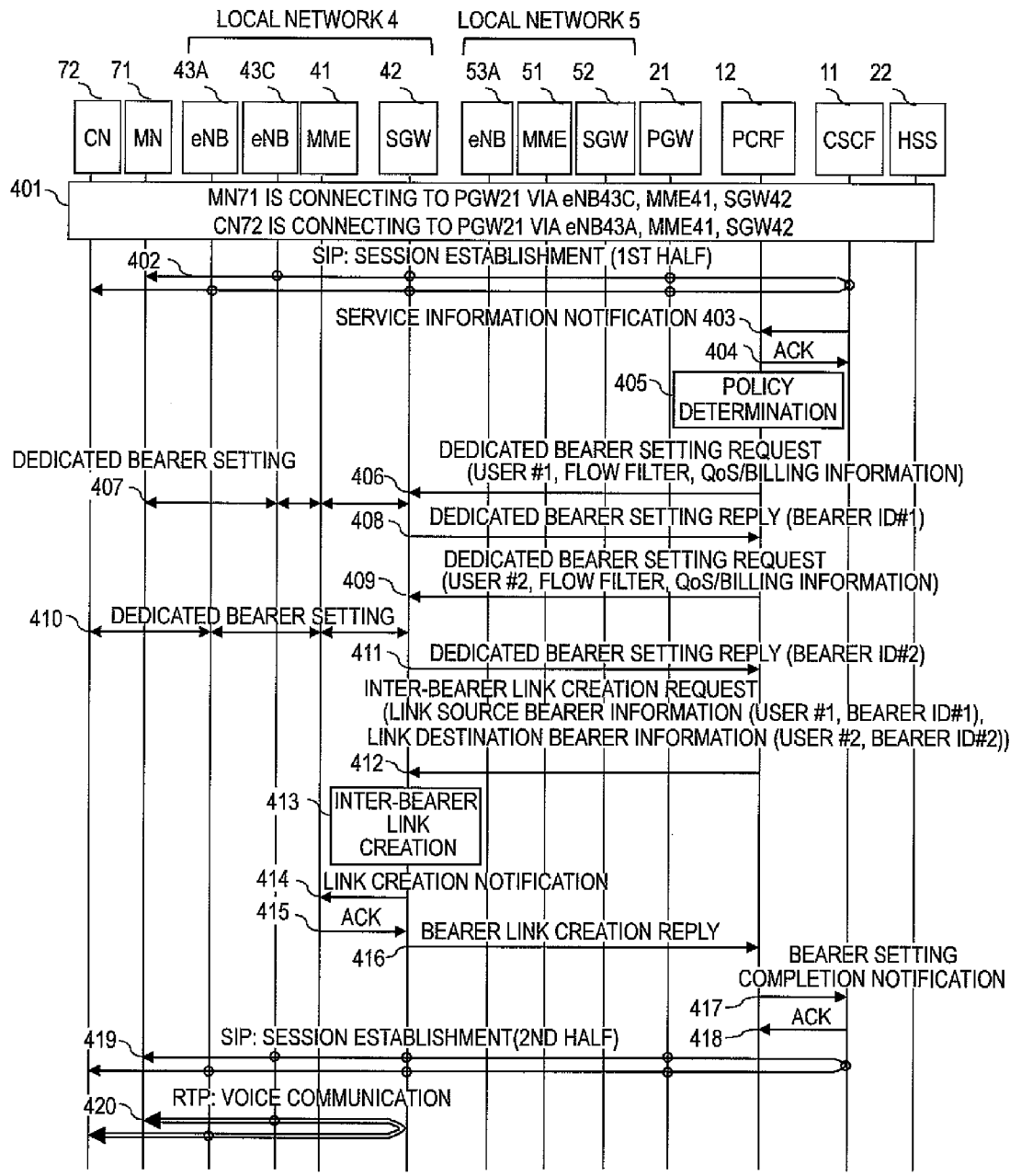
FIG. 6 is a sequence diagram illustrating a session establishment call flow in the case where a MN and a CN are accommodated in the same SGW in the first embodiment of the present invention.

FIG. 6 is a sequence diagram illustrating a session establishment call flow in the case where the MN 71 and the CN 72 are accommodated in the same SGW 42 in the first embodiment of the present invention.

First, in Step 401, the MN 71 is connected to the PGW 21 via the eNB 43C, the MME 41, and the SGW 42, and is in a state where a general-purpose bearer is established. Moreover, CN 72 is connected to the PGW 21 via the eNB 43A, the MME 41, and the SGW 42, and is in the state where a general-purpose bearer is established.

At this time, an IP address "192.168.0.100" is assigned to the MN 71, and an IP address "192.168.0.200" is assigned to the CN 72. Moreover, the bearer information management table 170 which the PCRF 12 manages is in a state where the entry 170A and the entry 170C related to general-purpose bearers are set. Furthermore, the uplink bearer management table 190 among which the SGW 42 manages is in a state where the entry 190A and the entry 190C are set. Moreover, the downlink bearer management table 210 which the SGW 42 manages is in a state where the entry 210A and the entry 210C are set.

Then, negotiation of a call session by using the SIP is performed between the MN 71 and the CN 72 (402).

The CSCF 11 extracts service information (IP address, a port number, a media type, a usage band of voice traffic communication, etc.) from the SIP message transmitted and received between MN 71 and the CN 72, and transmits the extracted service information to the PCRF 12 (403).

The PCRF 12 sets the transmitted information as the service information management table 150, and replies ACK to the CSCF 11 (404). 150A and 150B in FIG. 3A show an example of the setting in the case where the MN 71 and the CN 72 negotiate for bidirectional voice communication.

Then, the PCRF 12 determines a policy related to the bearer establishment based on the transmitted service information (405). As for the process of policy determination, specifically, the route determination routine 800 (refer to FIG. 7) and the QoS determination routine 820 (refer to FIG. 8) are executed. First, the route determination routine 800 will be described.

Figure 7:
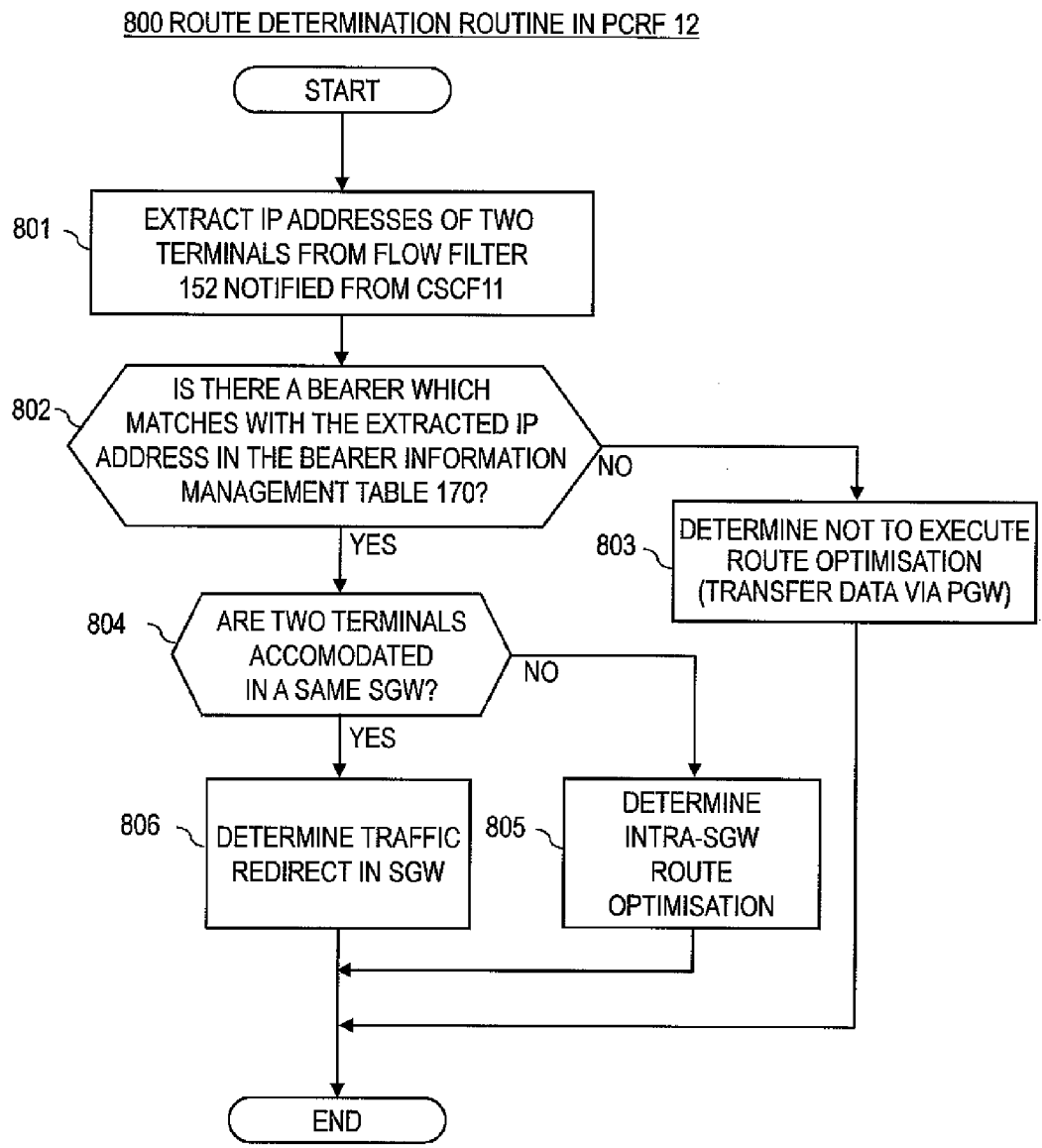
FIG. 7 is a flow chart illustrating the route determination routine according to the first embodiment of the present invention.

FIG. 7 is a flow chart illustrating the route determination routine 800 according to the first embodiment of the present invention.

The PCRF 12 extracts the IP addresses of two terminals (MN 71 and CN 72) from the flow filter 152B included on the service information transmitted from the CSCF 11 (801).

Then, the PCRF 12 searches for the bearer which matches the IP address of the extracted two terminals (MN 71 and CN 72) from the user IP 172 of the bearer information management table 170 (802).

If the above-described search fails, that is, if it is determined that there is no bearer which matches the IP address of the extracted two terminals (MN 71 and CN 72) in the bearer information management table 170, the PCRF 12 determines that the route optimization is not possible, and sets the usual data path, that is, the data path which routes the PGW 21 (803).

If the above search has succeeded in Step 802, that is, if it is determined that there is bearer which matches the IP address of the extracted two terminals (MN 71 and CN 72) in Step 802, the PCRF 12 determines whether the two terminals (MN 71, CN 72) are accommodated in the same SGW 42 or not (804). Specifically, the PCRF 12 refers to the bearer information management table 170, and determines whether the SGW ID 174 of the entry which matches with the IP address of each of the terminals (MN 71, CN 72) is the same or not.

If it is determined that the two terminals are not accommodated in a same SGW 42, that is, if it is determined that the two terminals (MN 71, CN 72) are accommodated in different SGW 42 and SGW 52, respectively, the PCRF 12 determines the route optimization between the SGW 42 and the SGW 52, and ends the processing (805). Details will be described later with reference to FIGS. 13-17.

If it is determined that two terminals are accommodated in the same SGW 42, the PCRF 12 determines to redirect the traffic locally within the SGW 42 (806), and ends the processing.

As described in the above, since the PCRF 12 which manages information of the SGW 42 which accommodates the terminals (MN 71, CN 72) determines the route, it is possible to set a suitable data path adapted to the present network configuration.

Now, the QoS determination routine 820 will be described.

Figure 8:
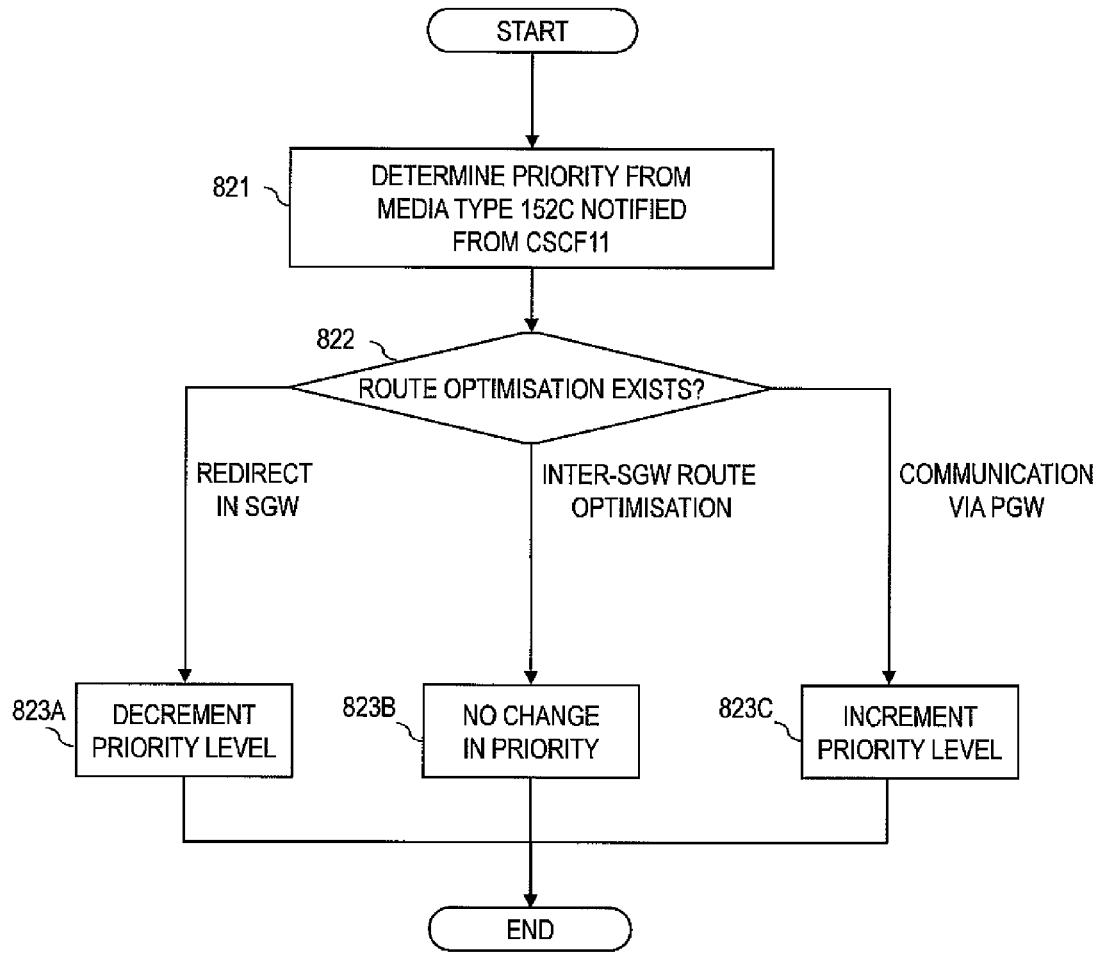
FIG. 8 is a flow chart illustrating a QoS determination routine according to the first embodiment of the present invention.

FIG. 8 is a flow chart illustrating the QoS determination routine 820 according to the first embodiment of the present invention.

The QoS determination routine 820 is executed after the route determination routine 800, and determines the priority of a flow based on whether the route optimization is determined or not. Specifically, the QoS determination routine 820 is a process for changing the QoS (priority) according to the hop number for the route.

The delay permitted for a node becomes small if the hop number increases, and therefore, it is necessary to set the priority high. In the first embodiment, since the hop number changes according to the route determination routines 800, the following the QoS determination routine 820 is executed.

First, the PCRF 12 determines default priority based on the media type 152C included in the service information transmitted from the CSCF 11 (821). It is noted that the PCRF 12 may be comprised of a table which manages priority for each media type in order to execute the above-described processing.

Then, the PCRF 12 determines whether the route optimization is determined or not (822). Specifically, the PCRF 12 holds the result of the route determination routine 800, and determines whether the route optimization is determined or not with reference to the result.

If the traffic redirect is determined within the SGW 42, the PCRF 12 decreases the default priority level determined in Step 821 by 1 because of allowing comparatively big transfer delay to each communication node on the route (823A), and ends the processing.

If it is determined to communicate via the PGW 21, because the delay permissible to each communication node on the route becomes small, therefore, the PCRF 12 increases the default priority level (823C), and ends the processing.

If the route optimization between the SGW 42 and the SGW 52 is determined, the hop number for the route is more than the case where it redirects within the SGW 52 (the case of Step 823A) and less than the case where it communicates via the PGW 21 route (the case of Step 823C), and therefore, the PCRF 12 does not change the default priority (823B), and ends the processing.

As described in the above, the PCRF 12 can set suitable QoS (priority) adapted to the network configuration by determining priority not only based on the media type 152C but also based on the hop number for the route.

Returning to FIG. 6, the description of the call flow will be continued.

The PCRF 12 which determined the policy about the bearer establishment in Step 405 transmits a dedicated bearer setting request to the SGW 42 which accommodates the MN 71 (406). The dedicated bearer setting request includes in the user ID 171, the flow filter 152B, and the QoS/billing information. It is noted that other information is also included in the dedicated bearer setting request.

Based on the information included in the received dedicated bearer setting request, the SGW 42 which received the dedicated bearer setting request transmits a bearer establishment request to the MME 41, and establishes dedicated bearers between the MN 71 and the eNB 43C and between the eNB 43C and the SGW 42 (407).

Hereafter, in Step 406 and Step 407, the procedure in which the SGW 42 sets the uplink bearer management table 190 and the downlink bearer management table 210 will be described.

Figure 9:
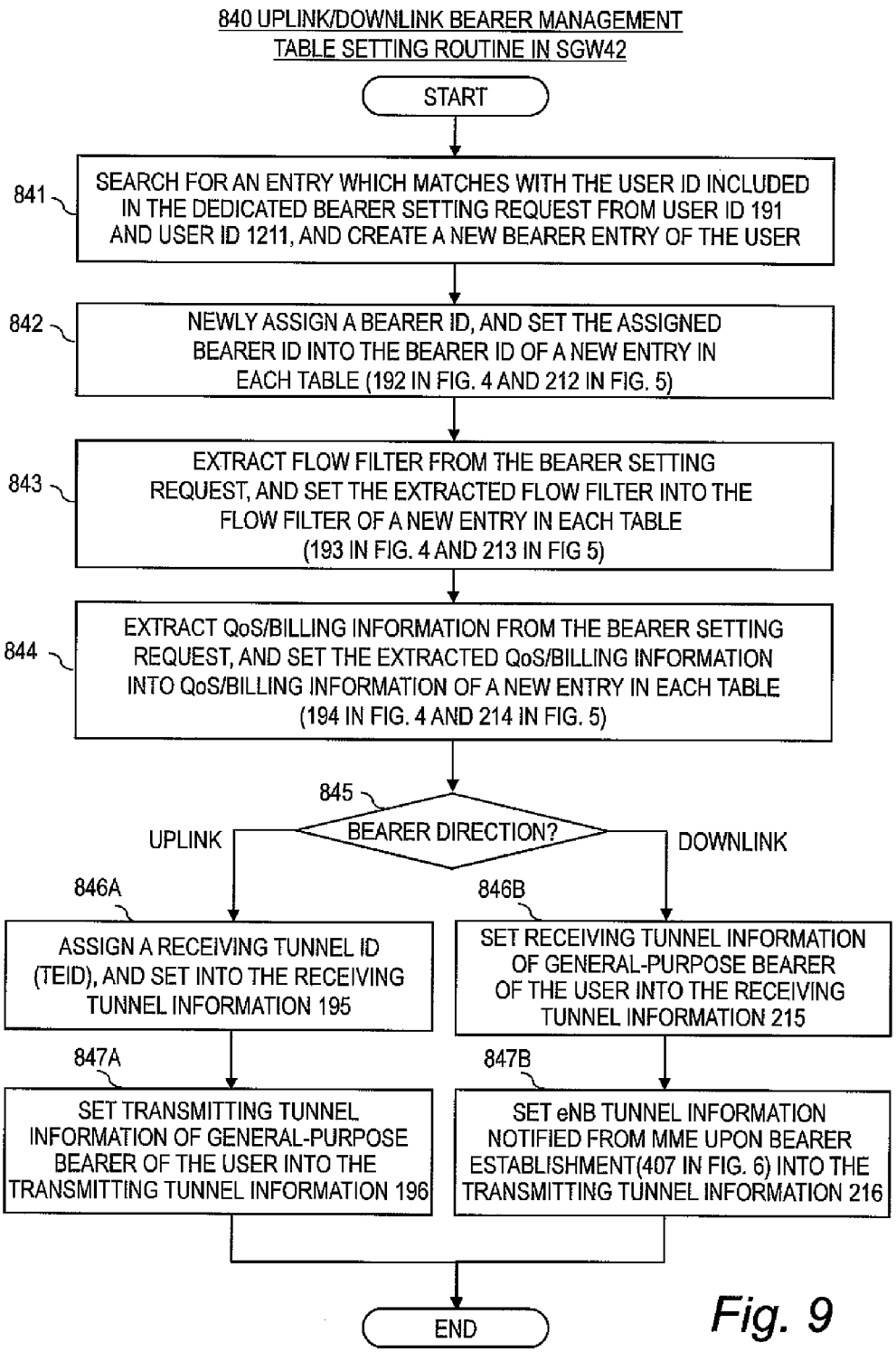
FIG. 9 is a flow chart illustrating an uplink/downlink bearer management table setting routine in the SGW according to the first embodiment of the present invention.

FIG. 9 is a flow chart illustrating the uplink/downlink bearer management table setting routine 840 in the SGW 42 according to the first embodiment of the present invention.

First, the SGW 42 refers to the user ID 191 in FIG. 4, and the user ID 211 in FIG. 5, searches for a bearer which matches with the user ID 171 included in the dedicated bearer setting request received from PCRF 12, and creates an entry for a new bearer into the user ID 191 and 211 which matches with the search result (841).

Then, the SGW 42 assigns a bearer ID to the created new entry, and sets the assigned bearer ID as bearer IDs 192 and 212 for the new entry, respectively (842).

Then, the SGW 42 extracts the flow filter 152B from the received dedicated bearer setting request, and sets the extracted flow filter 152B as the flow filters 193 and 213 of a new entry, respectively (843).

Then, the SGW 42 extracts QoS/billing information from the received dedicated bearer setting request, and sets the extracted QoS/billing information as QoS/billing information 194 and 214 for the new entry, respectively (Step 844).

Then, the SGW 42 determines the direction of the bearer (845). Specifically, the SGW 42 refers to the received dedicated bearer setting request to determine whether the direction of the bearer to be created is uplink or downlink.

If it is determined that the direction of the bearer is uplink, the SGW 42 assigns the receiving tunnel ID (TEID of GTP in the first embodiment) of the uplink direction, and sets the assigned receiving tunnel ID as the receiving tunnel information 195 in FIG. 4 (846A).

Then, the SGW 42 reproduces the transmitting tunnel information of the general-purpose bearer of the user to the transmitting tunnel information 196 of the new entry (847A), and ends the processing.

In Step 845, if it is determined that the direction of the bearer is downlink, the SGW 42 reproduces the receiving tunnel information of the general-purpose bearer of the user to the receiving tunnel information 215 of the new entry (846B).

Then, after establishing the dedicated bearer (407), the SGW 42 sets the eNB tunnel information transmitted from the MME 41 as the transmitting tunnel information 216 (847B), and ends the processing.

With the above processing, the SGW 42 can set information required in the uplink bearer management table 190 and the downlink bearer management table 210.

It is noted that the route optimization has not been executed at the time when the uplink/downlink bearer management table setting routine 840 is executed, and therefore, the voice traffic is transmitted and received via the PGW 21.

Returning to FIG. 6, the description of the call flow will be continued.

After a dedicated bearer is established in Step 407, the SGW 42 replies a dedicated bearer setting reply to the PGW 21 (408). The dedicated bearer setting reply includes in bearer ID (192, 212) assigned by the SGW 42.

Then, the PCRF 12 transmits the dedicated bearer setting request to the SGW 42 which accommodates the CN 72 (409).

In Steps 409-411, the processing same as the Steps 406-408 is executed. That is, in Step 410, based on the information included in the received dedicated bearer setting request, the SGW 42 which received the dedicated bearer setting request transmits a bearer establishment request to the MME 41, establishes dedicated bearers between the CN 72 and the eNB 43A, and between the eNB 43A and the SGW 42, and in Step 412, the SGW 42 replies a dedicated bearer setting reply to the PGW 21.

Then, the PCRF 12 transmits an inter-bearer link creation request to the SGW 42 (412). The inter-bearer link creation request contains link source bearer information (information related to the bearer used for the MN 71 to transmit and receive voice data), and link destination bearer information (information related to the bearer used for the CN 72 to transmit and receive voice data).

The SGW 42 which received the inter-bearer link creation request executes the inter-bearer link creation routine 860 which creates link information between the bearers based on the information included in the received inter-bearer link creation request (413).

Figure 10:
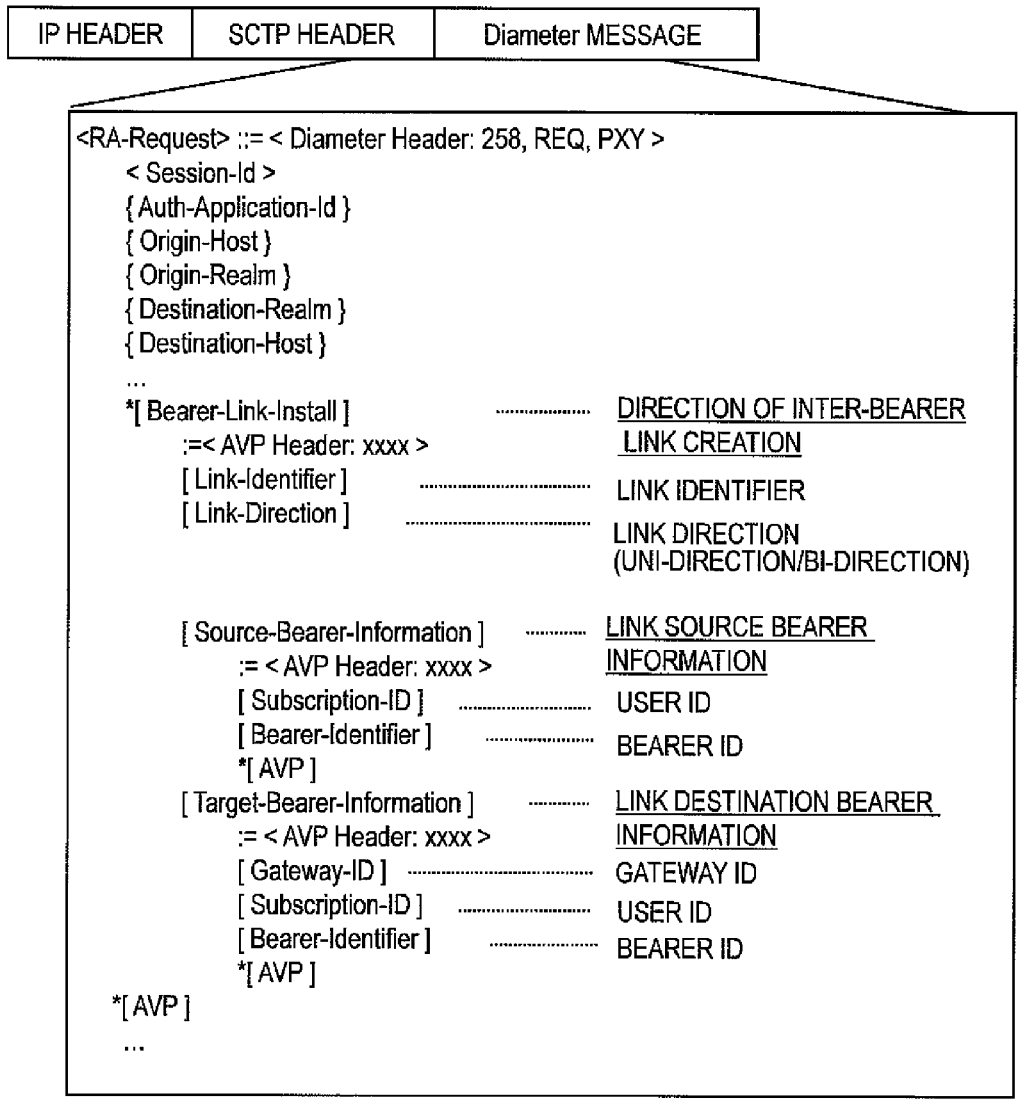
FIG. 10 is a diagram illustrating an example of the message format of an inter-bearer link creation request according to the first embodiment of the present invention.

FIG. 10 is a diagram illustrating an example of the message format of the inter-bearer link creation request according to the first embodiment of the present invention.

The inter-bearer link creation request is comprised of an IP header, an SCTP (Stream Control Transmission Protocol) header, and a Diameter message.

The Diameter message includes a Diameter header which indicates the type of the Diameter message, and a plurality of AVPs (Attribute Value Pairs), and the AVP includes Bearer-Link-Install AVP which indicates an inter-bearer link creation direction.

The Bearer-Link-Install AVP is comprised of a Link-Identifier AVP which further indicates an identifier of link information, a Link-Direction AVP which indicates the directivity of a link, a Source-Bearer-Information AVP which indicates link source bearer information, and a Target-Bearer-Information AVP which indicates link destination bearer information.

The Source-Bearer-Information AVP includes a Subscription-ID AVP which indicates the user information of the bearer, and a Bearer-Identifier AVP which indicates bearer ID.

The Target-Bearer-Information AVP includes a Subscription-ID AVP which indicates the user information of the bearer, and a Bearer-Identifier AVP which indicates the bearer ID, and it may further include a Gateway-ID AVP which indicates information of the gateway that holds the bearer.

It is noted that in the interface (3GPPTS29.212v8.0.0) between the PCRF 12 and the SGW 42 based on a conventional art, the Diameter session is established for each user and only the bearer information related to this user is transmitted within the Diameter session, and therefore, the present invention is characterized in that the link information between the bearers which different users hold is transmitted.

Figure 11:
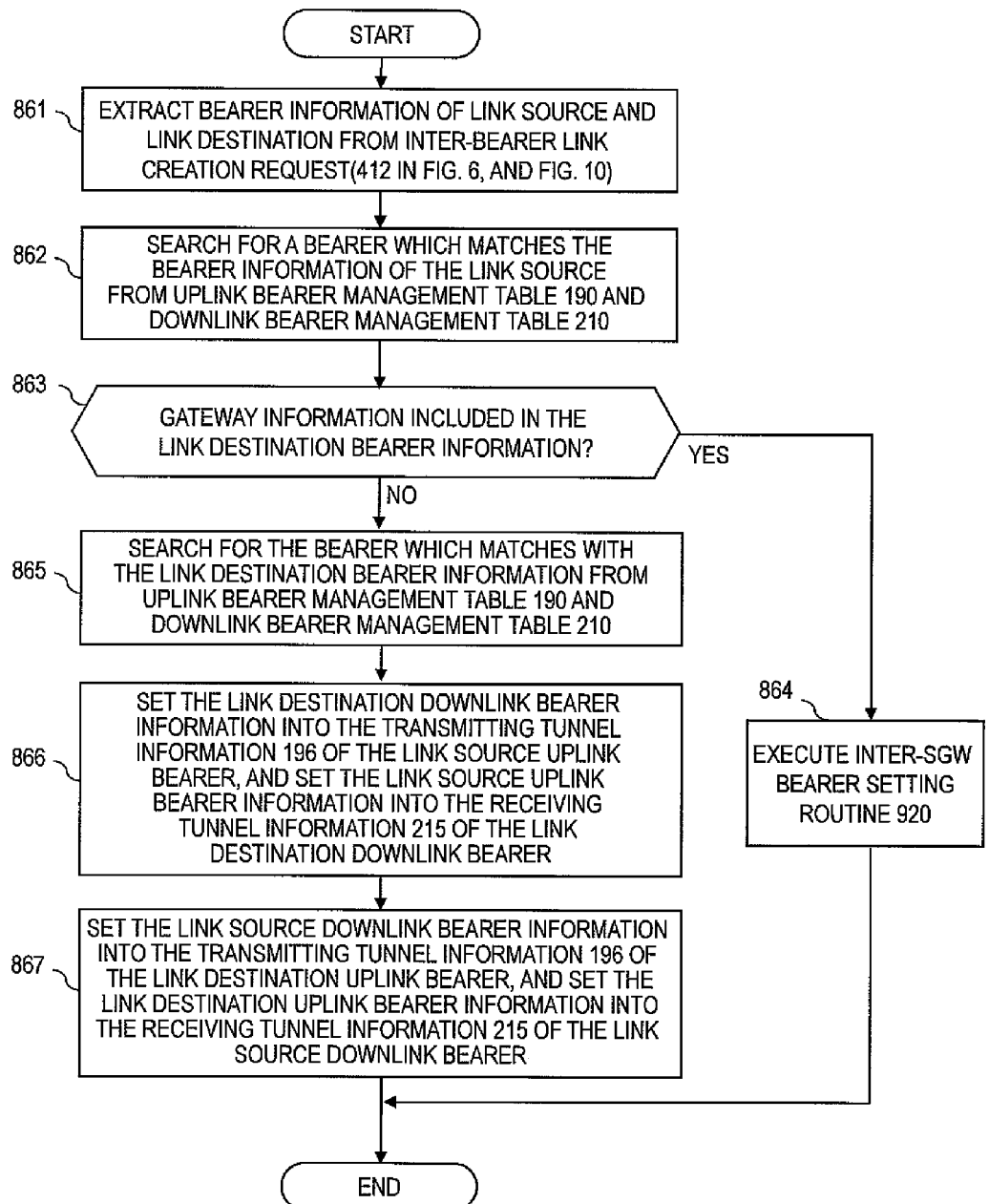
FIG. 11 is a flow chart illustrating an inter-bearer link creation routine according to the first embodiment of the present invention.

FIG. 11 is a flow chart illustrating an inter-bearer link creation routine 860 according to the first embodiment of the present invention.

First, the SGW 42 extracts the link source bearer information and the link destination bearer information from the inter-bearer link creation request received in Step 412 (861). The user ID 171 and the bearer IDs 192, 212 are included in the extracted link source bearer information and the link destination bearer information. It is noted that the extracted link source bearer information and the link destination bearer information may also include other information.

Then, the SGW 42 searches for the bearer which matches with the extracted link source bearer information from the uplink bearer management table 190 and the downlink bearer management table 210 (862).

Then, the SGW 42 determines whether gateway information is included in the link destination bearer information (863). Specifically, it determines whether the Gateway-ID AVP is contained in the Target-Bearer-Information AVP of the Diameter message or not.

If it is determined that gateway information is included in the link destination bearer information, the SGW 42 executes the inter-SGW bearer setting routine 920 (refer to FIG. 17) (864), and ends the processing. The inter-SGW bearer setting routine 920 will be described later with reference to FIG. 17.

If it is determined that gateway information is not included in the link destination bearer information, the SGW 42 searches for the bearer which matches with the link destination bearer information from the uplink bearer management table 190 and the downlink bearer management table 210 which the SGW 42 manages (865).

Then, the SGW 42 sets the link destination downlink bearer information to the transmitting tunnel information 196 of the link source uplink bearer, and sets the link source uplink bearer information to the receiving tunnel information 215 of the link destination downlink bearer (866). Specifically, the link destination downlink bearer information is set to the entry 190B, and the link source uplink bearer information is set to the entry 210D.

The SGW 42 sets the link source downlink bearer information to the transmitting tunnel information 196 of the link destination uplink bearer, and the link destination uplink bearer information is set to the receiving tunnel information 215 of the link source downlink bearer (867). Specifically, the link source downlink bearer information is set to the entry 190D, and the link destination uplink bearer information is set to the entry 210B.

With the above processing, a link is created between the bearer set between the MN 71 and the SGW 42, and the bearer set between the CN 72 and the SGW 42. Thereby, voice data can be redirected between the SGWs 42.

Returning to FIG. 6, the description of the call flow will be continued.

The SGW 42 which created the inter-bearer link in Step 413 transmits a link creation notification to the MME 41 (414). The transmitted link creation notification includes link information.

The MME 41 which received the link creation notification stores the link information included in the link creation notification to an internal table (not illustrated) and replies ACK (acknowledgement) to the SGW 42 (415).

Then, the SGW 42 transmits the bearer link creation reply to the PCRF 12 (416).

The PCRF 12 which received the bearer link creation reply transmits the bearer setting completion notification to the CSCF 11 (417).

The CSCF 11 which received the bearer setting completion notification replies ACK to the PCRF 12 (418), and completes the SIP session establishment between the MN 71 and the CN 72 (419).

After this event, the voice communication between the MN 71 and the CN 72 is started, and voice traffic is transferred on the route of [MN 71-eNB 43C-SGW 42-eNB 43A-CN 72] (420).

Voice traffic is transmitted on the route of [MN 71-eNB 43C-SGW 42-PGW 21-SGW 42-eNB 43A-CN 72] in conventional communication systems. However, in accordance with the present invention, the inter-bearer link information is stored in the uplink bearer management table 190 and the downlink bearer management table 210 of the SGW 42, and therefore, the present invention is characterized in that the voice traffic is transferred on the route of [MN 71-eNB 43C-SGW 42-eNB 43A-CN 72]. Hereafter, the mechanism of the voice traffic being redirected within the SGW 42 will be described with reference to FIG. 12.

Figure 12:
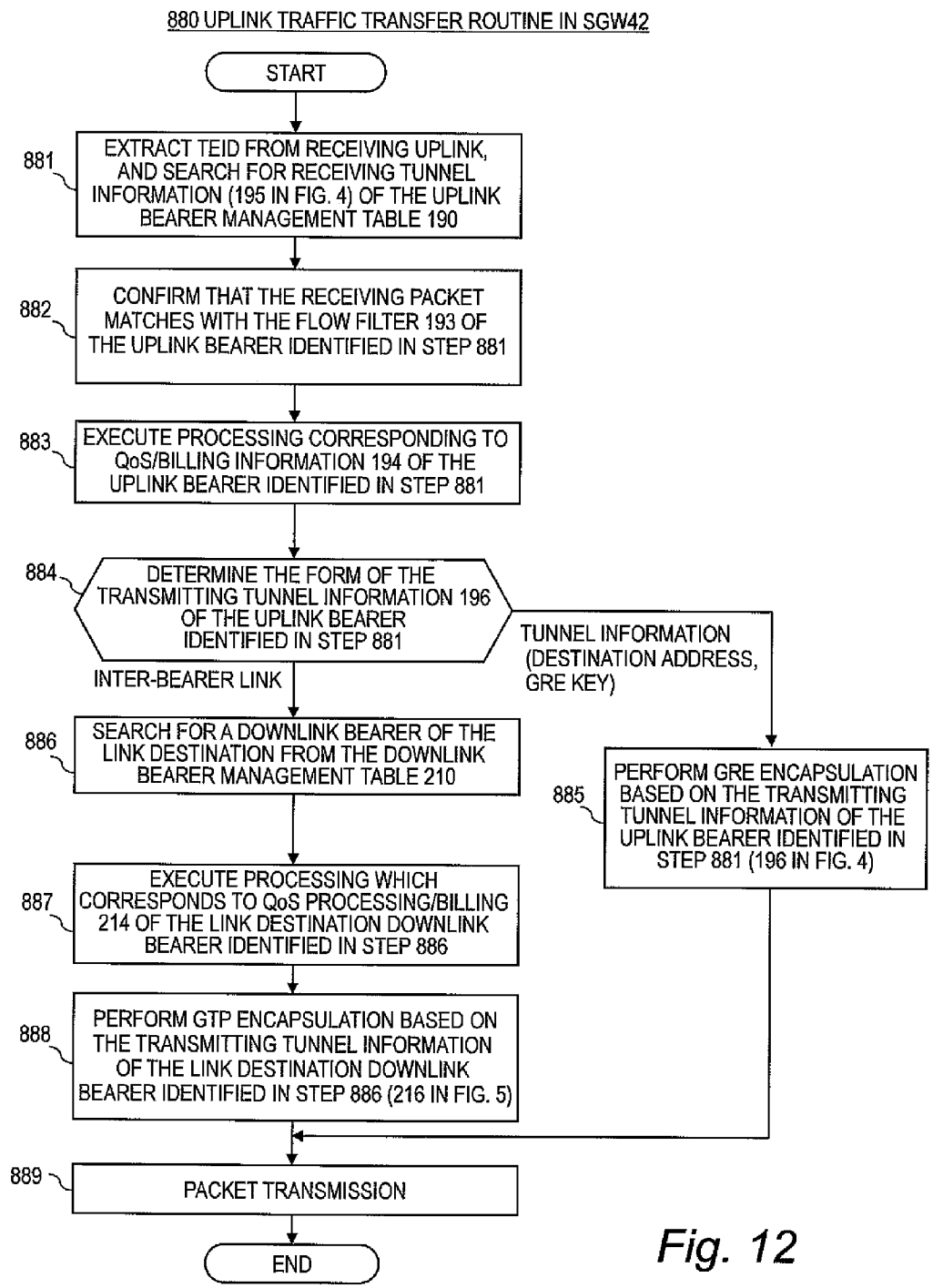
FIG. 12 is a flow chart illustrating an uplink traffic transfer routine which executed by the SGW according to the first embodiment of the present invention.

FIG. 12 is a flow chart illustrating an uplink traffic transfer routine 880 which executed by the SGW 42 according to the first embodiment of the present invention.

After receiving the uplink packet, the SGW 42 extracts the TEID of the GTP tunnel included in the received uplink packet, and searches for the bearer which matches with the TEID of the extracted GTP tunnel from the receiving tunnel information 195 of the uplink bearer management table 190 (881).

Then, the SGW 42 confirms that the received uplink packet matches with the flow filter 193 of the uplink bearer which is searched in Step 881 (882).

The SGW 42 executes processing which is based on the QoS/billing information 194 of the uplink bearer searched in Step 881 (883).

Then, the SGW 42 determines the form of the transmitting tunnel information 196 of the uplink bearer searched in Step 881 (884). Specifically, it is determined whether the form of the transmitting tunnel information 196 of the searched uplink bearer is that of the usual tunnel information or is that of the inter-bearer link information.

If it is determined that the form of the transmitting tunnel information 196 is the usual tunnel information, that is, if it is determined that the address of a destination node and GRE Key are stored in the transmitting tunnel information 196, based on this tunnel information, the SGW 42 executes GRE encapsulation (885), and transmits the GRE encapsulated packets to the terminal which corresponds to the address of the destination node, and ends the processing (889).

If it is determined that the form of the transmitting tunnel information 196 of the searched uplink bearer is that of the inter-bearer link information in Step 884, the SGW 42 searches for the bearer which matches with the bearer ID 212 of the downlink bearer of the link destination, which is stored in the transmitting tunnel information 196 of the uplink bearer, from the downlink bearer management table 210 (886).

The SGW 42 executes processing which is based on the QoS/billing information 214 of the bearer of the entry searched in Step 886 (887).

Then, based on the transmitting tunnel information 216 of the searched entry, the SGW 42 executes GTP encapsulation (888), transmits the GTP encapsulated packets to the downlink bearer of the link destination, and ends the processing (889).

With the above processing, the uplink traffic transfer routine 880 of the SGW 42 shown in FIG. 12 is completed.

Now, the session establishment processing in the case where the MN 71 and the CN 72 are accommodated in different SGWs 42, 52 will be described with reference to FIGS. 13-17.

Figure 13:
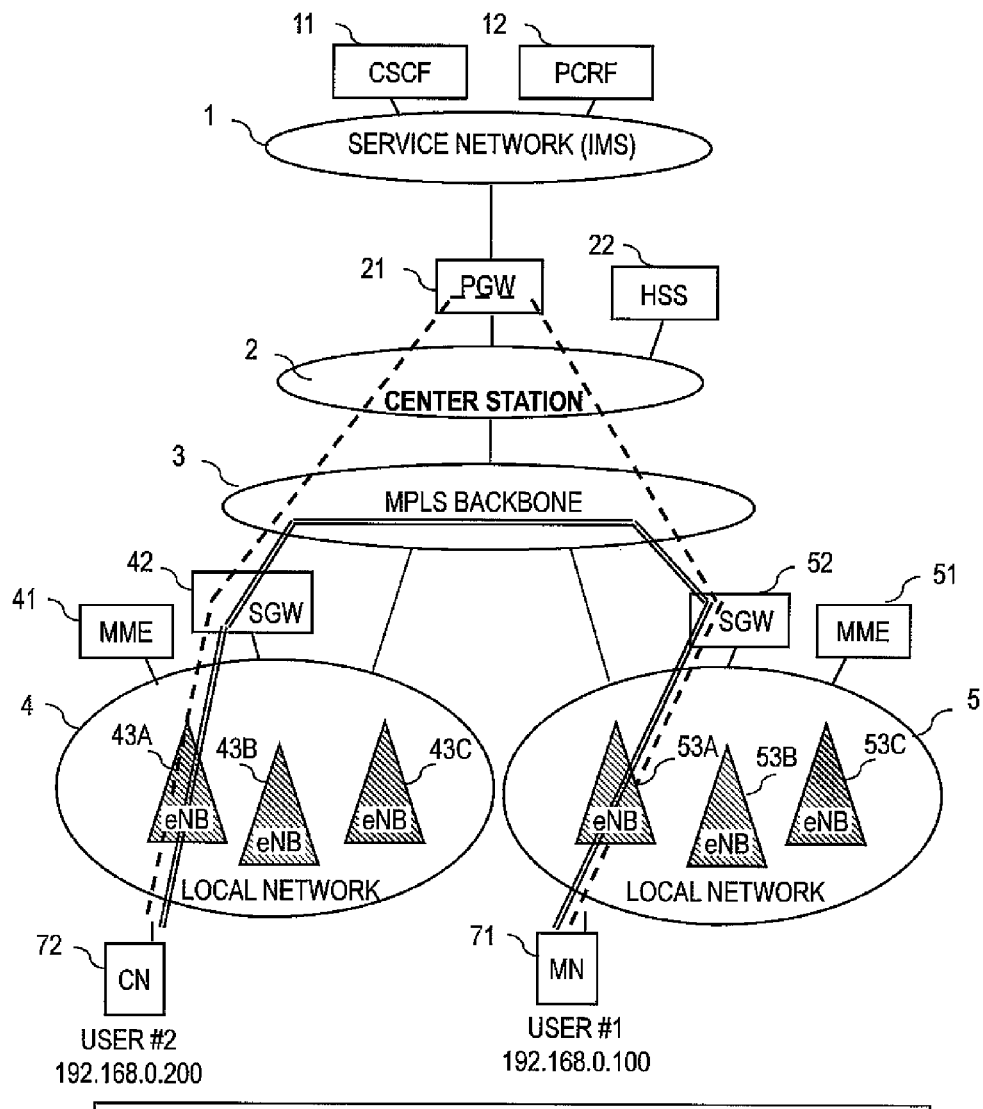
FIG. 13 is a diagram illustrating an example of a configuration of a communication network according to the first embodiment of the present invention.

FIG. 13 is a diagram illustrating an example of a configuration of a communication network according to the first embodiment of the present invention.

The configuration of the communication network is the same as that of the communication network in FIG. 1. In the example shown in FIG. 13, the MN 71 is accommodated in the SGW 52, and the CN 72 is accommodated in the SGW 42.

In conventional communication systems, voice traffic is transferred on the route of [MN 71-eNB 53A-SGW 52-PGW 21-SGW 42-eNB 43A-CN 72]. However, in the first embodiment, voice traffic is transferred on the route of [MN 71-eNB 53A-SGW 52-SGW 42-eNB 43A-CN 72] by the processing described later.

Figure 14:
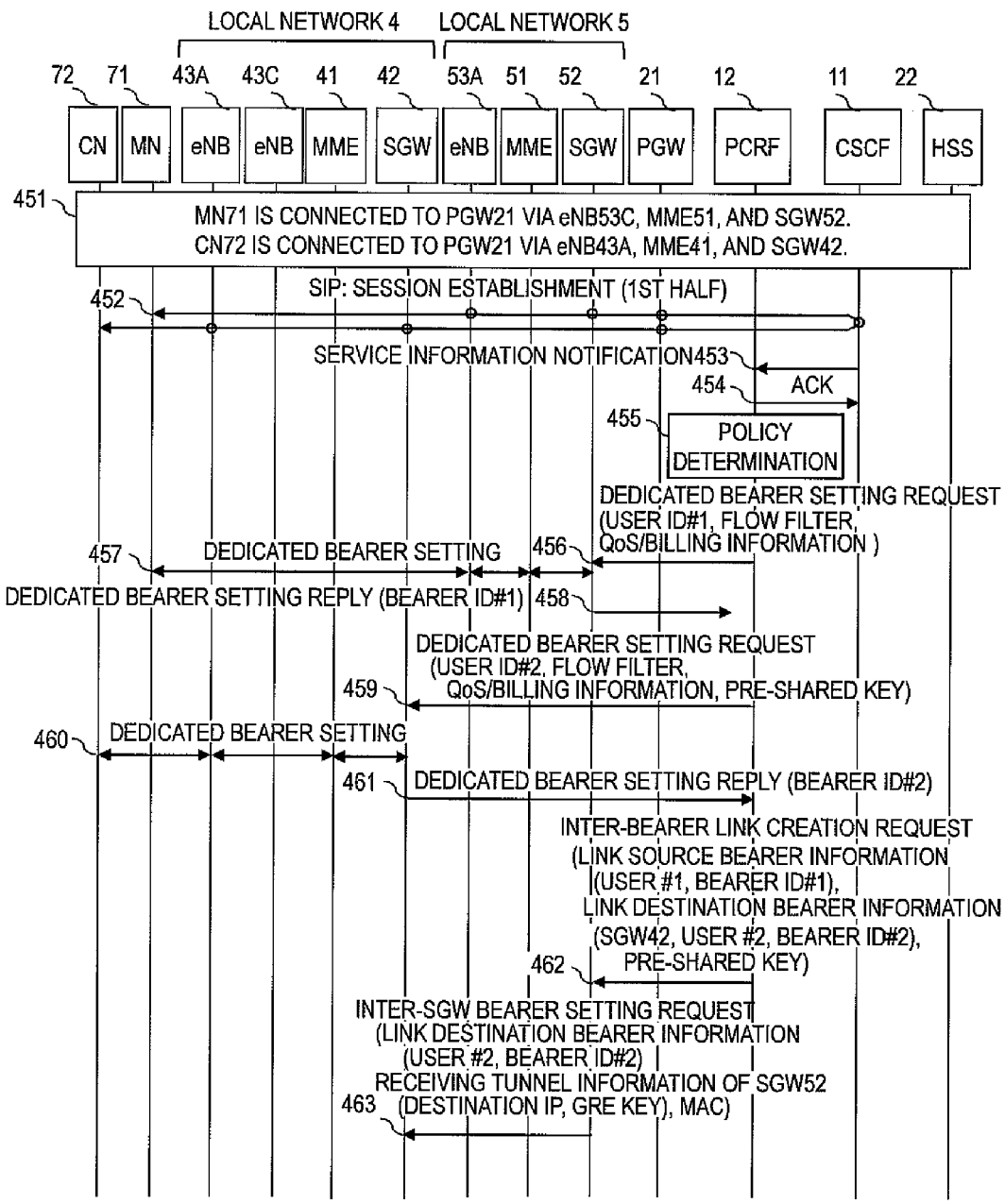
FIG. 14 and FIG. 15 are sequence diagrams illustrating the session establishment call flow in the case where the MN 71 and the CN 72 are accommodated in different SGWs in the first embodiment of the present invention.
Figure 15:
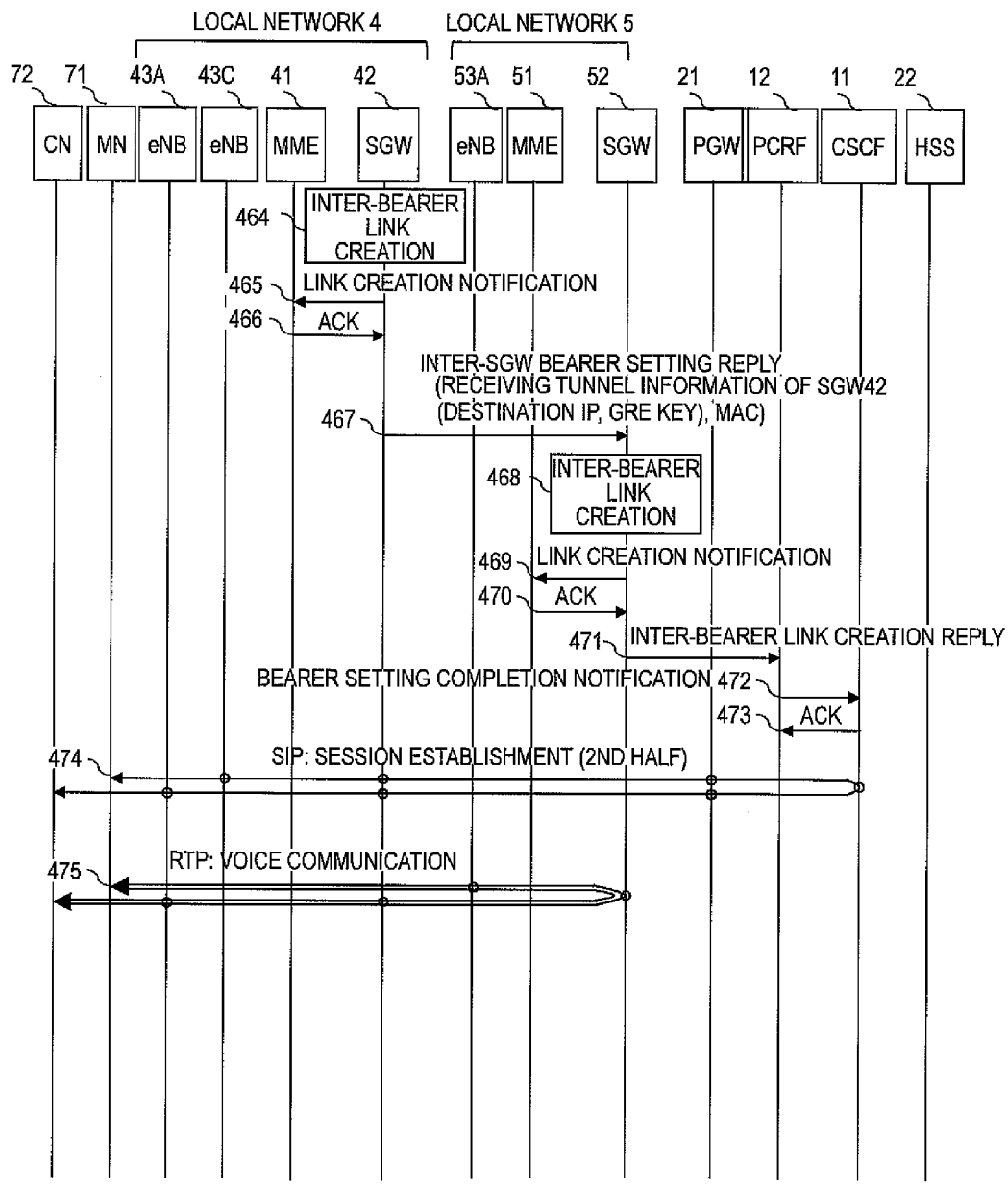

FIG. 14 and FIG. 15 are sequence diagrams illustrating the session establishment call flow in the case where the MN 71 and the CN 72 are accommodated in different SGWs 42, 52 in the first embodiment of the present invention.

First, in Step 451, the MN 71 is connected to the PGW 21 via the eNB 53A, the MME 51, and the SGW 52, and is in a state where a general-purpose bearer is established. Moreover, the CN 72 is connected to the PGW 21 via the eNB 43A, the MME 41, and the SGW 42, and is in the state where a general-purpose bearer is established.

At this time, an IP address "192.168.0.100" is assigned to the MN 71, and an IP address "192.168.0.200" is assigned to the CN 72.

Then, negotiation of a call session is performed between the MN 71 and the CN 72 by the SIP (452).

The CSCF 11 extracts service information (communication IP address, port number, media type, and usage band of the voice traffic, etc.) from the SIP message transmitted and received between the MN 71 and the CN 72, and transmits the extracted service information to the PCRF 12 (453).

The PCRF 12 sets the transmitted information as the service information management table 150, and replies ACK to the CSCF 11 (454).

Then, the PCRF 12 determines a policy about the bearer establishment based on the transmitted service information (455). Specifically, the PCRF 12 executes the route determination routine 800 (refer to FIG. 7). In the example shown in FIG. 13, in Step 804, it is determined that the two terminals (MN 71, CN 72) are not accommodated in a same SGW (42, 52), and the PCRF 12 determines the inter-SGW route optimization (805), and ends the processing.

Then, the PCRF 12 transmits a dedicated bearer setting request to the SGW 52 which accommodates the MN 71 (456). The dedicated bearer setting request to be transmitted includes the user ID 171, the flow filter 152B of the bearer, and the QoS/billing information of the bearer. It is noted that the dedicated bearer setting request includes other information.

Based on the information included in the received dedicated bearer setting request, the SGW 52 which received the dedicated bearer setting request transmits the dedicated bearer establishment request to the MME 51, and establishes dedicated bearers between the MN 71 and the eNB 53A, and between the eNB 53A and the SGW 52 (457). It is noted that in Step 456 and Step 457, the SGW 52 executes the uplink/downlink bearer management table setting routine 840.

After a dedicated bearer is established, the SGW 52 replies a dedicated bearer setting reply to the PGW 21 (458). The dedicated bearer setting reply includes bearer IDs (192, 212) which assigned by the SGW 42.

Then, the PCRF 12 transmits the dedicated bearer setting request to the SGW 42 which accommodates the CN 72 (459). The dedicated bearer setting request transmitted contains the user ID 171, the flow filter of the bearer 152B, QoS/billing information of the bearer, and Pre-shared Key.

The Pre-shared Key is used in order to authenticate in the inter-SGW bearer setting request and reply in the Steps 463 and 467, which will be described later. Conventionally, in processing of ProxyMobile IPv6 Route Optimization, authentication processing is executed between the SGWs, and by using the Pre-shared Key, it is possible to achieve increase in the speed of setting the path since needless packet processing is omissible.

In Steps 460-461, the same processing as Steps 457-458 is executed. That is, based on the information included in the received dedicated bearer setting request, the SGW 42 which received the dedicated bearer setting request in Step 460 transmits a bearer establishment request to the MME 41, establishes dedicated bearers between the CN 72 and the eNB 43A and between the eNB 43A and the SGW 42, and in Step 461, the SGW 42 replies a dedicated bearer setting reply to the PGW 21.

Then, the PCRF 12 which received the dedicated bearer setting reply transmits an inter-bearer link creation request to the SGW 52 (462). The inter-bearer link creation request includes link source bearer information (information related to the bearer used for the MN 71 to transmit and receive voice data), link destination bearer information (information related to the bearer used for the CN 72 to transmit and receive voice data), and the Pre-shared Key.

It is noted that although gateway information is not included in link destination bearer information in the example of the call flow in FIG. 6, in the example of the call flow in FIG. 14, since the MN 71 and the CN 72 are accommodated in different SGWs (42, 52), it differs in that it includes SGW ID 174 which indicates the SGW 42 as the gateway information of the link destination bearer.

The SGW 52 which received the inter-bearer link creation request executes the inter-bearer link creation routine 860 (refer to FIG. 11). In the example of a call flow in FIG. 14, since the gateway information of a link destination bearer is included, it is determined that gateway information is included in link destination bearer information in Step 863 in FIG. 11, and the SGW 52 executes the inter-SGW bearer setting routine 920 (864). As a result, Steps 463-470 are executed.

Hereafter, after explaining the flow in Steps 463-470, the inter-SGW bearer setting processing which the SGW 42 and the SGW 52 executes will be described in detail with reference to FIG. 16 and FIG. 17.

First, processing in Steps 463-470 will be described.

The SGW 52 transmits the inter-SGW bearer setting request to the SGW 42 (463). The inter-SGW bearer setting request includes link destination bearer information, the receiving tunnel information 195 (destination IP addresses and GRE Key) of the SGW 52, and MAC (Message Authentication Code) calculated from the Pre-shared Key.

After verifying the rightfulness of the MAC included in the inter-SGW bearer setting request using the Pre-shared Key included in the received inter-SGW bearer setting request, the SGW 42 which received the inter-SGW bearer setting request creates the inter-bearer link according to the link destination bearer information and the receiving tunnel information 195 of the SGW 52 (464).

After the inter-bearer link is created, the SGW 42 transmits the inter-bearer link creation notification to the MME 41 (465).

The MME 41 which received the link creation notification stores the link information included in the link creation notification into an internal table (not illustrated), and replies ACK to the SGW 42 (466).

Then, the SGW 42 replies an inter-SGW bearer setting reply to the SGW 52 (467). The inter-SGW bearer setting reply includes the receiving tunnel information 195 (destination IP address and GRE Key) of the SGW 42, and the MAC.

After verifying the rightfulness of the MAC included in the inter-SGW bearer setting request using the Pre-shared Key included in the received inter-SGW bearer setting reply, the SGW 52 which received the inter-SGW bearer setting reply creates an inter-bearer link using the receiving tunnel information 195 of the SGW 42 (468).

After the inter-bearer link is created, the SGW 52 transmits the inter-bearer link creation notification to the MME 51 (469).

The MME 51 which received the link creation notification stores the link information included in the link creation notification into an internal table (not illustrated), and replies ACK to the SGW 52 (470).

Then, the SGW 52 replies the inter-bearer link creation reply to the PCRF 12 (471). With the above processing, processing of 463-470 is completed.

Now, the inter-SGW bearer setting routine 900 in the SGW 42 will be described with reference to FIG. 16.

Figure 16:
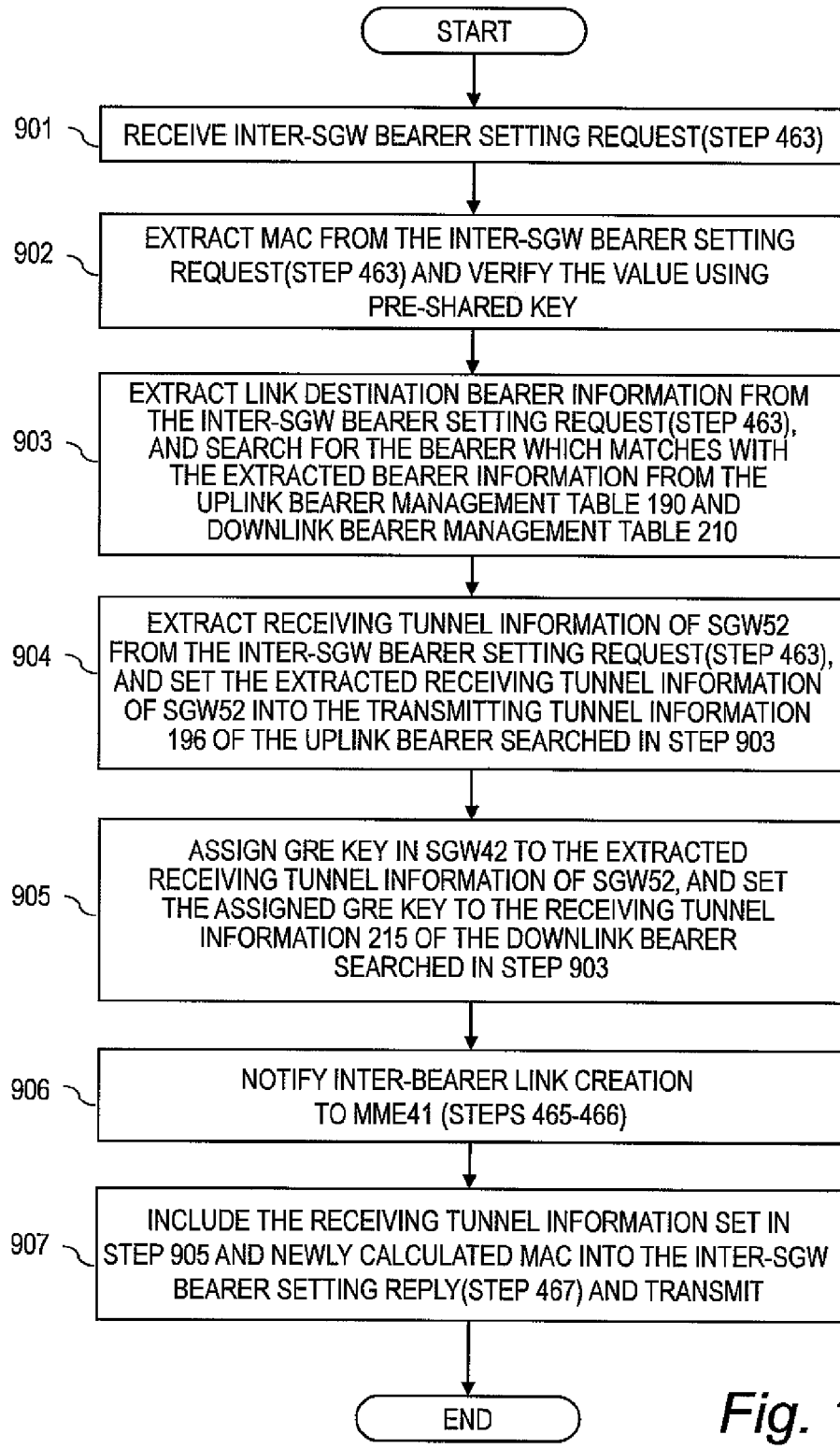
FIG. 16 is a flow chart illustrating an inter-SGW bearer setting routine executed by the SGW according to the first embodiment of the present invention executes.

FIG. 16 is a flow chart illustrating the inter-SGW bearer setting routine 900 executed by the SGW 42 according to the first embodiment of the present invention executes.

First, the SGW 42 receives the inter-SGW bearer setting request transmitted from the SGW 52 in Step 463 (901).

Then, the SGW 42 extracts the MAC from the received inter-SGW bearer setting request and verifies the value of the MAC extracted using Pre-shared Key contained in the received inter-SGW bearer setting request (902).

Then, the SGW 42 extracts the link destination bearer information from the received inter-SGW bearer setting request, and searches for the bearer which matches with the extracted link destination bearer information from the uplink bearer management table 190 and the downlink bearer management table 210 which the SGW 42 manages (903).

Then, the SGW 42 extracts the receiving tunnel information 195 of the SGW 52 from the received inter-SGW bearer setting request, and sets the extracted receiving tunnel information 195 of the SGW 52 to the transmitting tunnel information 196 of the uplink bearer searched in Step 903 (904).

Next, the SGW 42 assigns the GRE Key in the SGW 42 and sets the assigned GRE Key to the receiving tunnel information 215 of the downlink bearer which is searched in Step 903 (905).

Then, the SGW 42 transmits inter-bearer link creation notification to the MME 41, and receives the reply of the notification from the MME 41 (906).

Thereafter, the SGW 42 transmits to the SGW 52 an inter-SGW bearer setting reply including the receiving tunnel information 215 of the SGW 42 assigned in Step 905, and the MAC calculated from the Pre-shared Key (907).

With the above processing, the inter-SGW bearer setting routine 900 which the SGW 42 executes is completed.

Now, the inter-SGW bearer setting routine 920 in the SGW 52 will be described with reference to FIG. 17.

Figure 17:
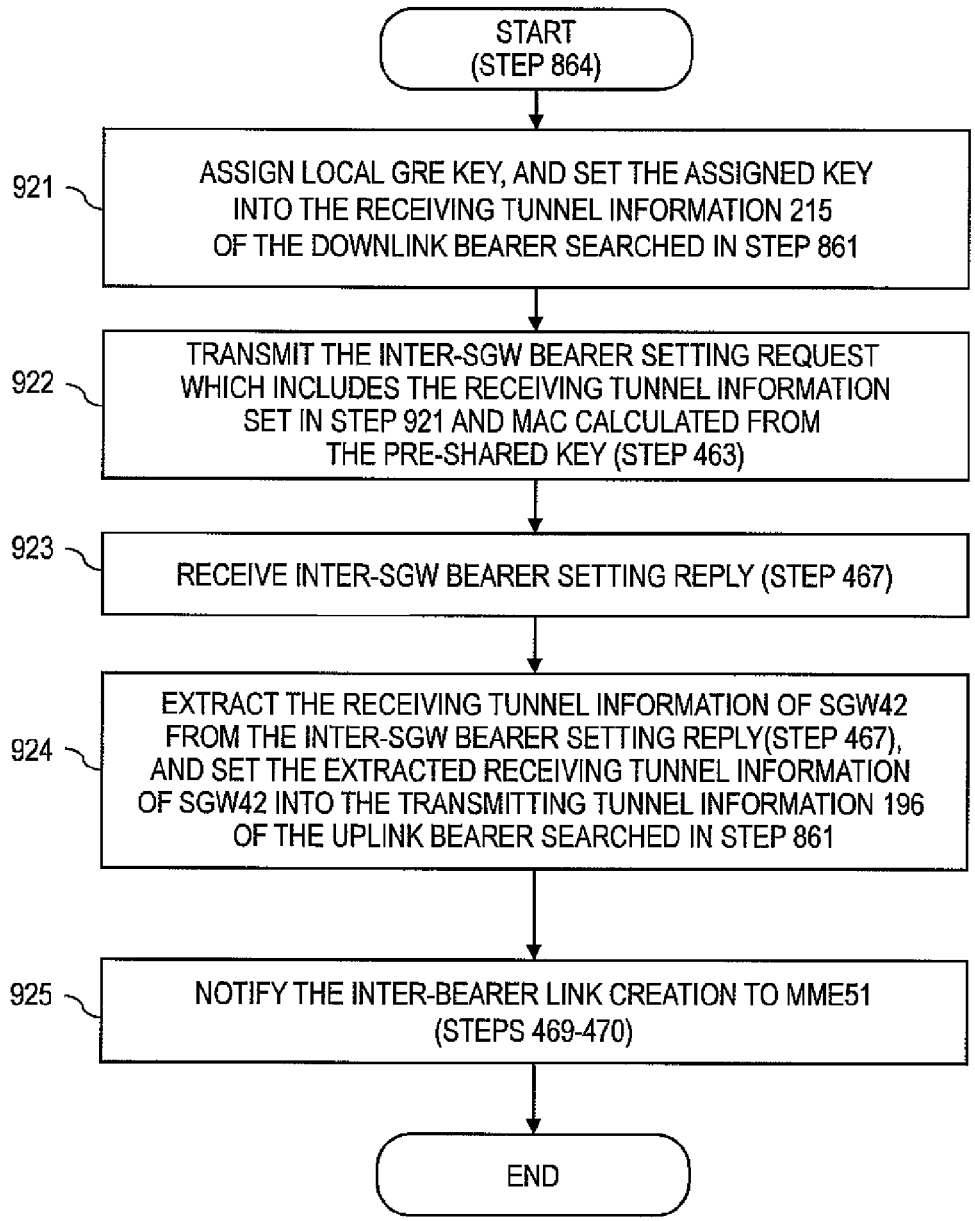
FIG. 17 is a flow chart illustrating the inter-SGW bearer setting routine executed by the SGW in accordance with the first embodiment of the present invention.

FIG. 17 is a flow chart illustrating the inter-SGW bearer setting routine 920 executed by the SGW 52 in accordance with the first embodiment of the present invention.

The inter-SGW bearer setting routine 920 is a process executed in Step 864 of the inter-bearer link creation routine 860 (refer to FIG. 11) after the SGW 52 receives the inter-bearer link creation request transmitted from the PCRF 12 in Step 462.

First, the SGW 52 assigns the local GRE Key, and sets the GRE Key which is assigned to the receiving tunnel information 215 of the downlink bearer searched in Step 861 (921).

Then, the SGW 52 transmits to the SGW 42 an inter-SGW bearer setting request including the receiving tunnel information 215 set in Step 921, and the MAC calculated from the Pre-shared Key (922).

Then, the SGW 52 receives an inter-SGW bearer setting reply from the SGW 42 (923).

Next, the SGW 52 extracts the receiving tunnel information 215 of the SGW 42 from the received inter-SGW bearer setting reply, and sets the extracted receiving tunnel information 215 of the SGW 42 to the transmitting tunnel information 196 of the uplink bearer searched in Step 861 (924).

Then, the SGW 52 transmits an inter-bearer link creation notification to the MME 51, receives the reply of the notification from the MME 41, and ends the processing (925).

With the above processing, the inter-SGW bearer setting routine 920 which the SGW 52 executes is completed.

Returning to FIG. 15, the description of the call flow will be continued.

After the inter-SGW bearer setting processing is executed in Steps 463-470, the SGW 52 transmits an inter-bearer link creation reply to the PCRF 12 (471).

The PCRF 12 which received the inter-bearer link creation reply transmits a bearer setting completion notification to the CSCF 11 (472).

The CSCF 11 which received the bearer setting completion notification transmits the reply to the notification to the SGW 52 (473).

The CSCF 11 completes the SIP session establishment processing between the MN 71 and the CN 72 (474), and the voice communication between the MN 71 and the CN 72 is started (475).

Conventionally, the voice traffic between the MN 71 and the CN 72 is transmitted on the route of [MN 71-eNB 53A-SGW 52-PGW 21-SGW 42-eNB 43A-CN 72]. In the first embodiment, it is characterized in that the voice traffic is transferred on the route of [MN 71-eNB 53A-SGW 52-SGW 42-eNB 43A-CN 72] by the route optimization.

It is noted that although the way the SGWs 42, 52 transmit user data in the first embodiment is the same as the uplink traffic transfer routine 880 shown in FIG. 12, in the first embodiment, the tunnel information of the inter-SGW bearer is set to the transmitting tunnel information 196 of the uplink bearer confirmed in Step 884, and therefore, the first embodiment is different from the conventional method in that Step 885 is executed.

Now, an example of the call flow at the time of the session termination will be described with reference to FIG. 18.

Figure 18:
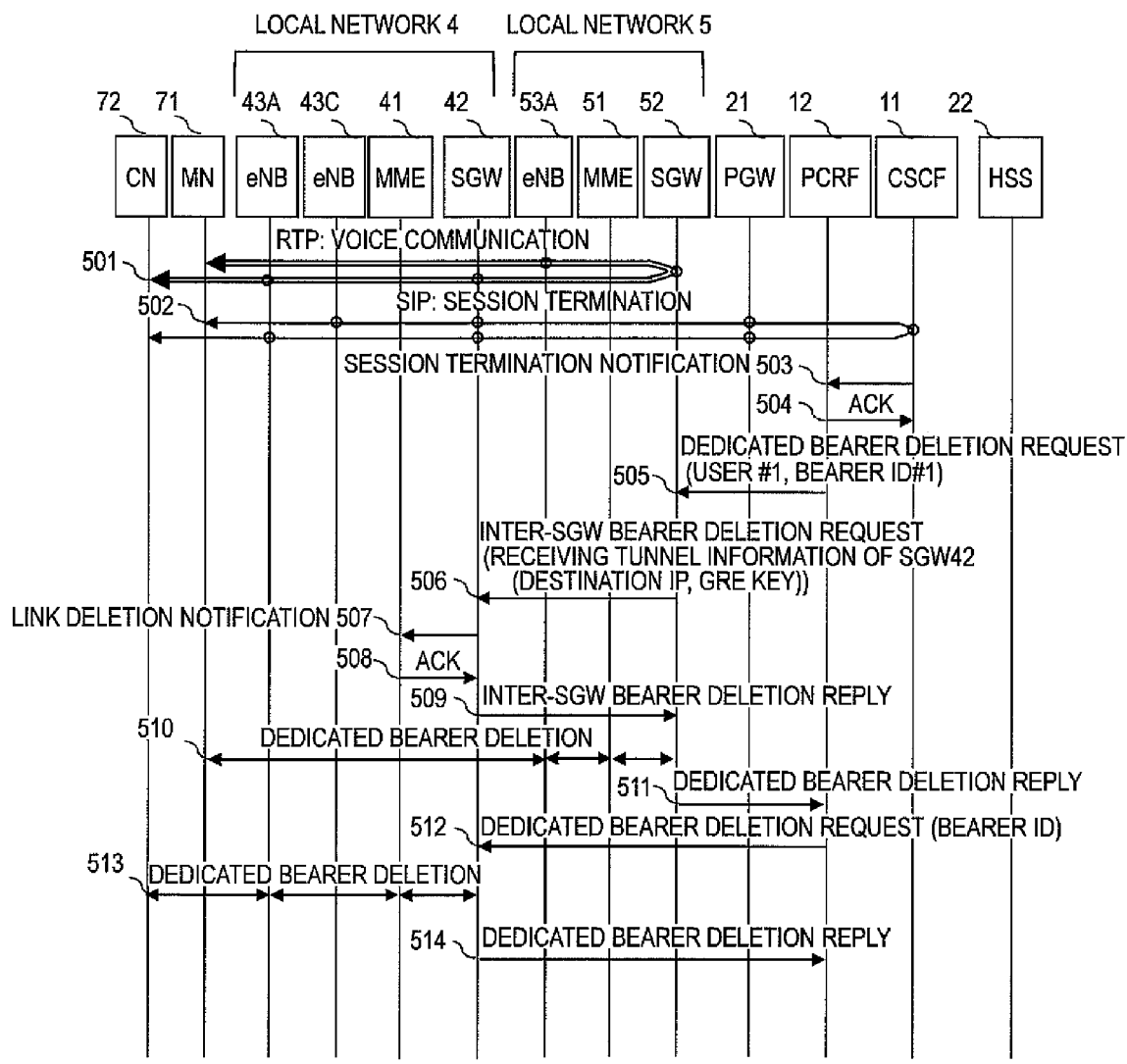
FIG. 18 is a flow chart illustrating a call flow at the time of the session termination according to the first embodiment of the present invention.

FIG. 18 is a flow chart illustrating the call flow at the time of the session termination according to the first embodiment of the present invention.

First, in Step 501, the MN 71 and the CN 72 are performing voice communication on the route of [MN 71-eNB 53A-SGW 52-PGW 21-SGW 42-eNB 43A-CN 72].

Then, in Step 502, the MN 71 and the CN 72 negotiate for session termination using the SIP.

The CSCF 11 transmits the notification of the session termination to the PCRF 12 (503), and the PCRF 12 which received the notification transmits ACK for the notification to the CSCF 11 (504).

The PCRF 12 which received the ACK transmits a dedicated bearer deletion request to the SGW 52 which accommodates the MN 71 (505). The dedicated bearer deletion request contains the user ID 171 and the ID of the bearer to be deleted.

The SGW 52 which received the dedicated bearer deletion request transmits an inter-SGW bearer deletion request to the SGW 42 (506). The inter-SGW bearer deletion request includes the receiving tunnel information 195 (IP address of the destination node and GRE Key) of the SGW 42. In the first embodiment, in order to delete the inter-bearer link created between the SGW 42 and the SGW 52, a dedicated bearer deletion request is transmitted.

The SGW 42 which received the inter-SGW bearer deletion request transmits a link deletion notification to the MME 41, after deleting an inter-bearer link based on the received inter-SGW bearer deletion request (507).

The MME 41 which received the link deletion notification transmits ACK to the SGW 42 to the notification (508).

Then, the SGW 42 transmits an inter-SGW bearer deletion reply to the SGW 52 (509).

The SGW 52 which received the inter-SGW bearer deletion reply transmits a dedicated bearer deletion request to the MME 51, and deletes the dedicated bearers between the MN 71 and the eNB 53A and between the eNB 53A and the SGW 52 (510).

Then, the SGW 52 transmits a dedicated bearer deletion reply to the PCRF 12 (511).

The PCRF 12 which received the dedicated bearer deletion reply transmits a dedicated bearer deletion request to the SGW 42 which accommodates the CN 72 (512).

The SGW 42 which received the dedicated bearer deletion request transmits a dedicated bearer deletion request to the MME 41, and deletes the dedicated bearers between the CN 72 and the eNB 43A and between the eNB 43A and the SGW 42 (513).

The SGW 42 transmits a dedicated bearer deletion reply to the PCRF 12 (514).

With the above processing, the call flow at the time of the session termination shown in FIG. 18 is completed.

Now, an example of a call flow in the case where the MN 71 performs hand-over to domains for different SGWs (42, 52) while the MN 71 and the CN 72 are communicating at a domain for the same SGW (42, 52) will be described with reference to FIG. 19 and FIG. 20.

Figure 19:
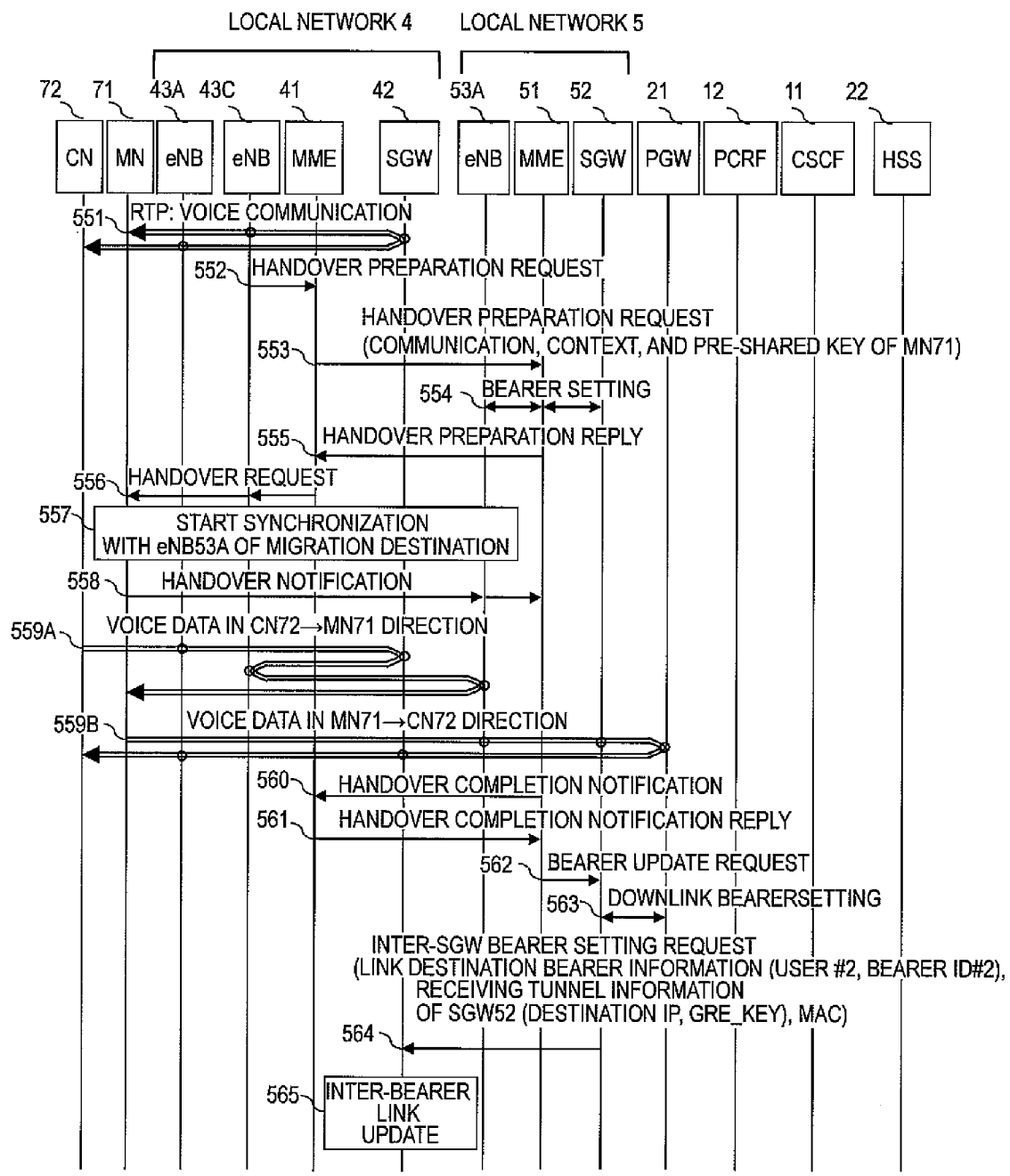
FIG. 19 and FIG. 20 are flow charts illustrating a call flow in a case where the MN performs hand-over to the domains for different SGWs, while the MN and the CN are communicating at the domain for the same SGW according to the first embodiment of the present invention.
Figure 20:
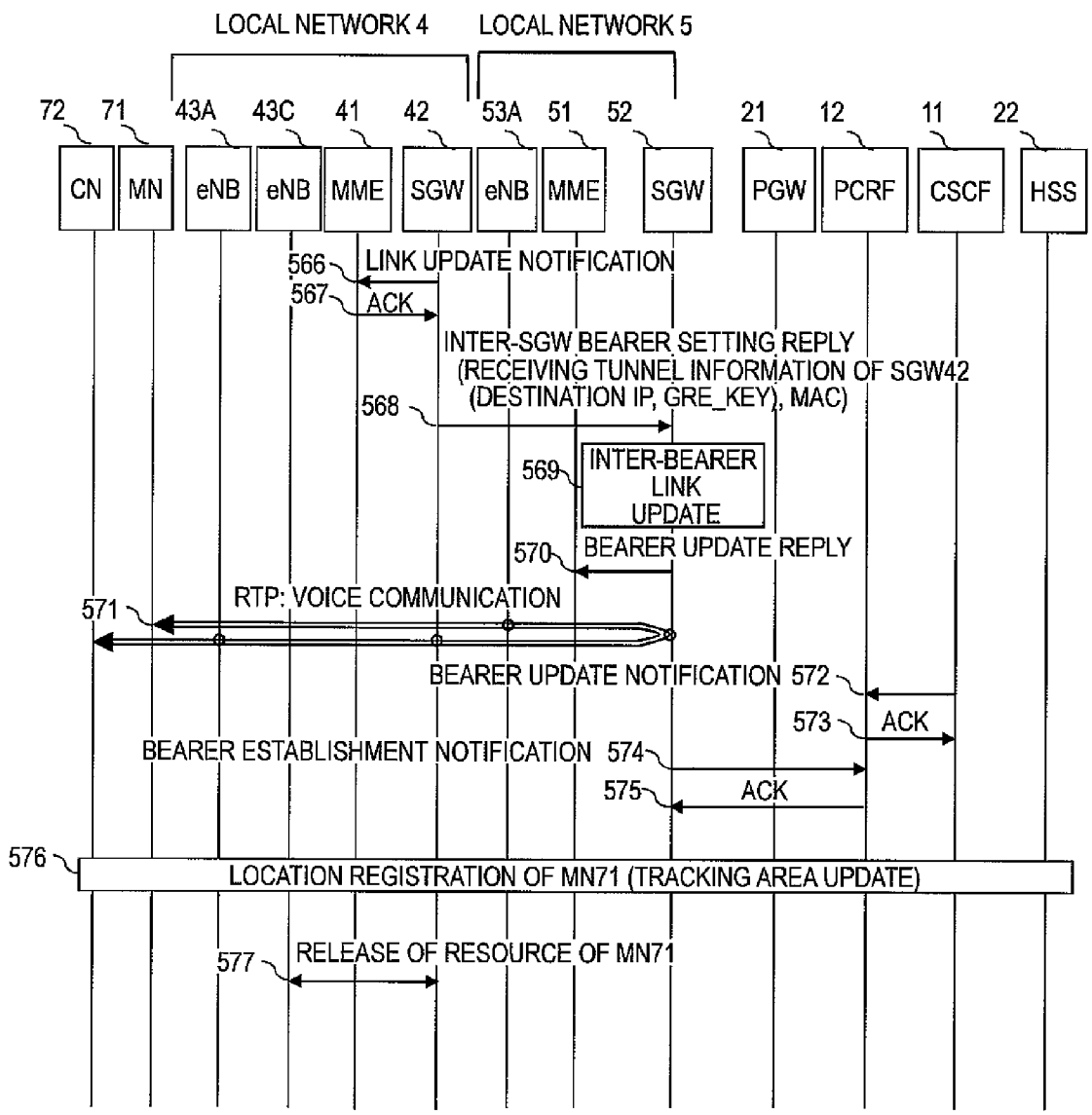

FIG. 19 and FIG. 20 are flow charts illustrating the call flow in the case where the MN 71 performs hand-over to the domains for different SGWs 52, while the MN 71 and the CN 72 are communicating at the domain for the same SGW 42 according to the first embodiment of the present invention.

First, in Step 551, the MN 71 and the CN 72 are in a state under voice communication on the route of [MN 71-eNB 43C-SGW 42-eNB 43A-CN 72].

Since the radio condition of the MN 71 changes, the eNB 43C transmits a hand-over preparation request of the MN 71 to the MME 41 (552).

The MME 41 which received the hand-over preparation request transmits a hand-over preparation request to the MME 51 of a move destination (553). The hand-over preparation request includes communication context information of the MN 71 (bearer information which MN 71 holds), and the Pre-shared Key. The Pre-shared Key is used for authenticating in the inter-SGW bearer setting request of Step 564 and the inter-SGW bearer setting reply of Step 568, which are described later.

The MME 51 which received the hand-over preparation request sets the bearer between the eNB 53A and the SGW 52 of the move destination based on the communication context information included in the received hand-over preparation request (554).

Then, the MME 51 transmits a hand-over preparation reply to the MME 41 (555).

The MME 41 transmits a hand-over request to the MN 71 via the eNB 43C in response to the reception of the hand-over preparation reply (556).

The MN 71 secedes from the eNB 43C in response to the reception of the hand-over request, and starts the synchronization with the eNB 53A (557), and transmits a hand-over notification to the MME 51 via the eNB 53A.

At this time, the traffic from the CN 72 to the MN 71 is transferred on the route of [CN 72-eNB 43A-SGW 42-eNB 43C-eNB 53A-MN 71] using the bearer between the eNB 43C and the eNB 53A which is set in Steps 552-556 (559A).

On the other hand, the traffic from the MN 71 to the CN 72 is transmitted on the route of [MN 71-eNB 53A-SGW 52-PGW 21-SGW 42-eNB 43A-CN 72] (559B). After the hand-over, the inter-bearer link is not created between the SGW 52 and the SGW 42, and therefore, a general-purpose bearer will be used.

Then, the MME 51 which received the hand-over notification transmits a hand-over completion notification to the MME 41 of the move source (560).

The MME 41 which received the hand-over completion notification transmits a hand-over completion notification reply to the MME 51 as a reply to the received hand-over completion notification (561).

The MME 51 which received the hand-over completion notification reply transmits a bearer update request to the SGW 52 (562).

The SGW 52 sets a downlink bearer between the SGW 52 and the PGW 21 in response to the reception of the bearer update request (563).

Then, the SGW 52 transmits an inter-SGW bearer setting request to the SGW 42 based on the inter-bearer link information included in the hand-over preparation request received in Step 553 (564). The inter-SGW bearer setting request includes the link destination bearer information, the receiving tunnel information of the SGW 52, and the MAC.

The SGW 42 which received the inter-SGW bearer setting request updates the link information of the bearer based on the received inter-SGW bearer setting request (565), and transmits a link update notification to the MME 41 (566). The update of the link information of the bearer of Step 565 is the same processing as Step 464.

The MME 41 which received the link update notification transmits ACK for the notification to the SGW 42 (567).

Then, the SGW 42 transmits an inter-SGW bearer setting reply to the SGW 52 (568). The inter-SGW bearer setting reply includes the receiving tunnel information 215 of the SGW 42 and the MAC.

The SGW 52 which received the inter-SGW bearer setting reply updates the inter-bearer link information based on the received inter-SGW bearer setting reply (569), and replies a bearer update reply to the MME 51 (570).

At this time, the voice traffic between the MN 71 and the CN 72 is transferred on the route of [MN 71-eNB 53A-SGW 52-SGW 42-eNB 43A-CN 72] (571).

Then, the PGW 21 transmits a bearer update notification to the PCRF 12 (572), and the PCRF 12 transmits ACK to the notification to the PGW 21 (573).

Moreover, the SGW 52 transmits the bearer establishment notification to the PCRF 12 (574), and the PCRF 12 transmits ACK to the notification to the SGW 42 (575).

Moreover, the location registration is executed for the eNB 53A and the MME 51 of the move destination of the MN 71 (576), and the MME 41 of the move source releases the resources of the MN 71 from the eNB 43C and the SGW 42 (577).

With the above processing, the hand-over processing of the MN 71 shown in FIG. 19 and FIG. 20 is completed.

In the example of the call flow shown in FIG. 19 and FIG. 20, it is characterized in that in Step 553, the MME 41 of the move source transmits the communication context included in the hand-over preparation request with the inter-bearer link information, and in Step 564, the inter-SGW bearer setting request is transmitted based on the link information which the MME 51 received. By executing the above processing, even in the case where the SGW (42, 52) is changed at the time of the hand-over, it is possible to take over the inter-bearer link information to the SGW (42, 52) of the move destination.

Second Embodiment

In the first embodiment of the invention, the dedicated bearer is set at the initiative on the PCRF 12 based on the service information transmitted from the CSCF 11. However, the second embodiment of the invention shows an example for setting the dedicated bearer for specific applications at the initiative on the terminal (MN 71, CN 72).

Although the network configuration in accordance with the second embodiment of the present invention is the same as that of FIG. 1 and FIG. 13, it differs in that the PCRF 12 is comprised of a terminal flow information management table 230 (refer to FIG. 21).

FIG. 21 is a diagram illustrating an example of a configuration of the terminal flow information management table 230 which managed by the PCRF 12 according to the second embodiment of the present invention. The terminal flow information management table 230 is a table for the PCRF 12 to manage the dedicated bearer information of which the terminals (MN 71, CN 72) requested the setting.

The terminal flow information management table 230 includes the user ID 231 and the flow information 232.

The user ID 231 is an identifier for identifying the terminals (MN 71, CN 72) uniquely. The flow information 232 stores flow information requested from the terminal (MN 71, CN 72).

Moreover, the flow information 232 includes the flow ID 232A, the flow direction 232B, the flow filter 232C, the priority 232D, and the bandwidth 232E.

The flow ID 232A, the flow filter 232C, and the bandwidth 232E are the same as the flow ID 152A, the flow filter 152B, and the bandwidth 152D in FIG. 2A.

The flow direction 232B stores information which shows the direction of a flow, and, specifically, it stores either "uplink" or "downlink". The priority 232D stores the information which shows QoS.

Next, an example of the call flow which sets a dedicated bearer on the initiative of the terminal (MN 71, CN 72) is shown.

Figure 22:
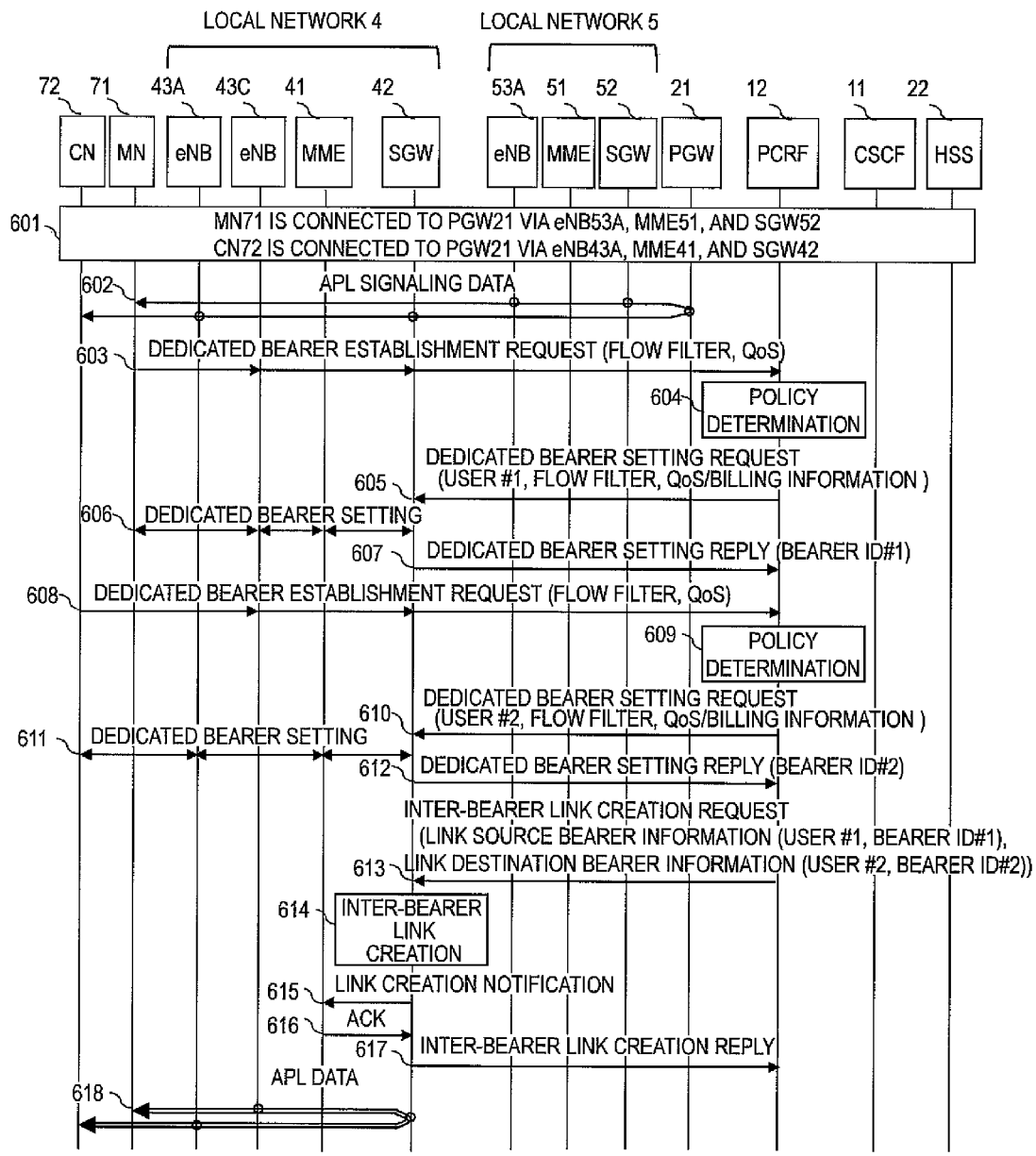
FIG. 22 is a sequence diagram illustrating a call flow which sets a dedicated bearer on the initiative of the terminal (MN, CN) according to the second embodiment of the present invention.

FIG. 22 is a sequence diagram illustrating a call flow which sets a dedicated bearer on the initiative of the terminal (MN 71, CN 72) according to the second embodiment of the present invention.

First, in Step 601, the MN 71 is connected to the PGW 21 via the eNB 53C, the MME 51, and the SGW 42, and is in the state where a general-purpose bearer is established. Moreover, the CN 72 is connected to the PGW 21 via the eNB 43A, the MME 41, and the SGW 42, and is in a state where a general-purpose bearer is established.

Then, the MN 71 exchanges control data of the application with the CN 72 (602).

The MN 71 transmits a dedicated bearer establishment request to the PCRF 12 via the eNB 43C and the SGW 42 based on the information exchanged in Step 602 (603).

The PCRF 12 which received the dedicated bearer establishment request stores the flow filter and QoS information of the bearer which is included in the received dedicated bearer establishment request into the terminal flow information management table 230, and determines the policy about the bearer establishment (604). Specifically in Step 604, the route determination routine 940 (refer to FIG. 23) is executed.

Figure 23:
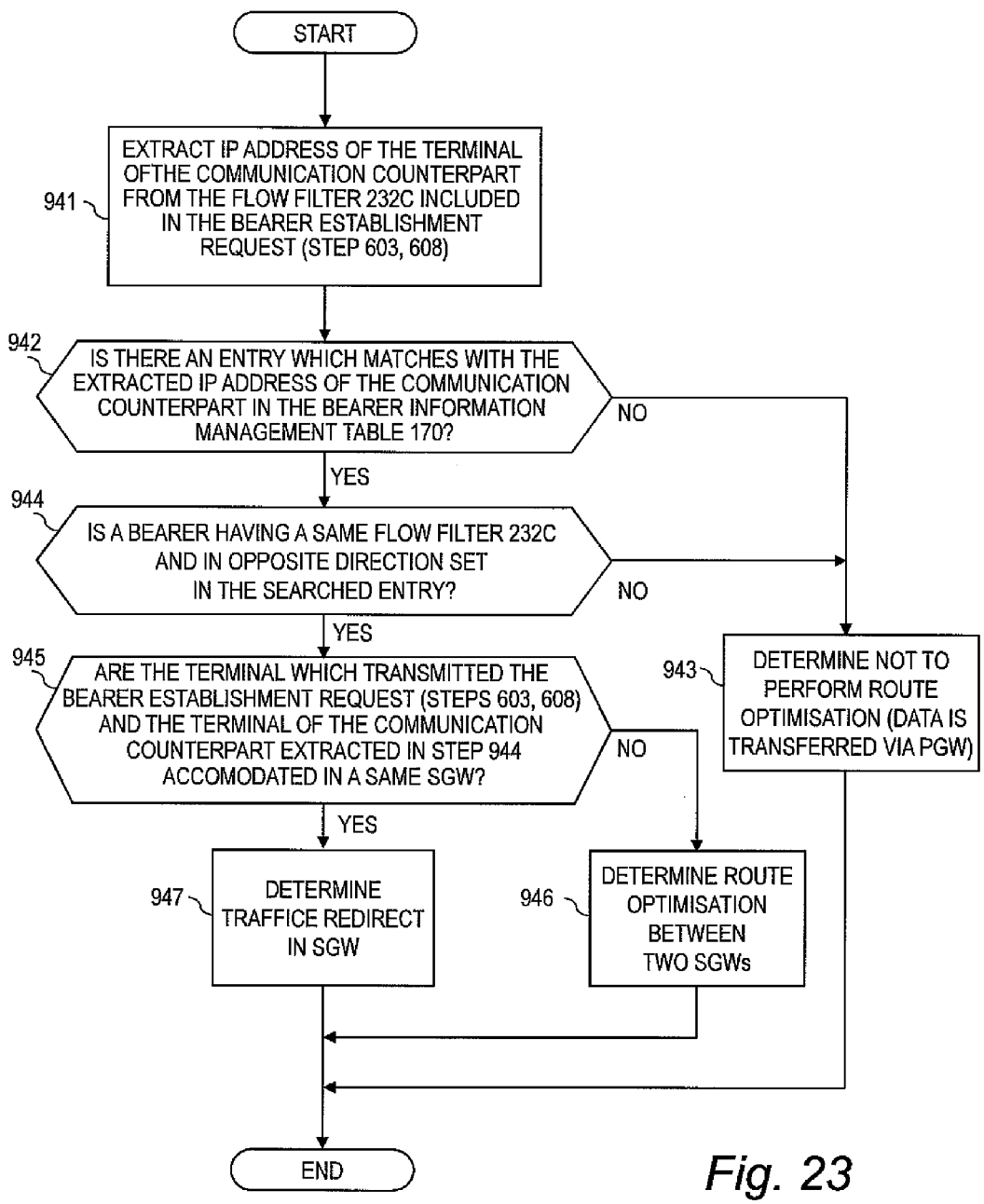
FIG. 23 is a flow chart illustrating a route determination routine which executed by the PCRF according to the second embodiment of the present invention

FIG. 23 is a flow chart illustrating the route determination routine 940 which executed by the PCRF 12 according to the second embodiment of the present invention.

The PCRF 12 extracts the IP address of the communication counterpart of the terminal (MN 71, CN 72) from the flow filter 232C transmitted from the terminal (941).

Then, the PCRF 12 determines whether the entry which matches with the extracted IP address of the communication counterpart exists in the bearer information management table 170 or not (942).

If it is determined that there is no entry which matches with the IP address of the extracted communication counterpart, the PCRF 12 determines not to execute the route optimization (943) and ends the processing.

If there is an entry which matches with the IP address of the extracted communication counterpart, the PCRF 12 refers to the flow direction 232B of the searched entry, and determines whether it is a bearer which has the same flow filter 232C and set the opposite direction of the bearer or not (944).

If it is determined that a matched bearer is not found in Step 944, the PCRF 12 determines not to execute the route optimization (943) and ends the processing.

On the other hand, if it is determined that a bearer which has the same flow filter 232C and set the opposite direction of the bearer, the PCRF 12 determines whether the terminal (MN 71) which transmitted the dedicated bearer establishment request, and the terminal (CN 72) which set the bearer which has the same flow filter 232C and set the opposite direction of the bearer are accommodated in the same SGW (42, 52) or not (945).

If it is determined that the terminal (MN 71) which transmitted the dedicated bearer establishment request, and the terminal (CN 72) which set the bearer which has the same flow filter 232C and set the opposite direction of the bearer are accommodated in different SGWs (42, 52), the PCRF 12 determines the route optimization between the two SGWs (946), and ends the processing.

If it is determined that the terminal (MN 71) which transmitted the dedicated bearer establishment request, and the terminal (CN 72) which set the bearer which has the same flow filter 232C and set the opposite direction of the bearer are accommodated in a same SGW (42, 52), the PCRF 12 determines the traffic redirect within the SGW (42, 52) (947), and ends the processing.

In the case of the second embodiment of the present invention, the bearer at the CN 72 side is not yet set in the stage of Step 604 in FIG. 22, and the search in Step 944 fails, and therefore, it determines not to execute the optimization (943).

Returning to FIG. 22, the description of the call flow will be continued.

The PCRF 12 executes the route determination routine 940 in Step 604, and determines not to execute the route optimization at this time.

The PCRF 12 transmits a dedicated bearer setting request to the SGW 42 which accommodates the MN 71 based on the policy determined in Step 604 (605). The dedicated bearer setting request includes the user ID 231, the flow filter 232C, and QoS/billing information.

Based on the information included in the received dedicated bearer setting request, the SGW 42 which received the dedicated bearer setting request transmits a dedicated bearer setting request to the MME 41, and sets dedicated bearers between the MN 71 and the eNB 43C and between the eNB 43C and the SGW 42 (606).

The SGW 42 transmits a dedicated bearer setting reply to the PCRF 12 (607). The dedicated bearer setting reply includes a bearer ID 192 assigned to the dedicated bearer to which set by the SGW 42.

Then, the CN 72 transmits a dedicated bearer establishment request to the PCRF 12 (608). The dedicated bearer establishment request includes the flow filter and the QoS information which are set based on the information exchanged in Step 602.

The PCRF 12 which received the dedicated bearer establishment request stores the flow filter and the QoS information of the bearer which are included in the received dedicated bearer establishment request in the terminal flow information management table 230, and determines the policy about the bearer establishment (609). The same processing as Step 604 is executed in Step 609.

In Step 609, it is determined that the search for the entry which matches the determination conditions of Step 944 succeeds since the bearer at the MN 71 side is already set, and the MN 71 and the CN 72 are accommodated in the same SGW 42 in Step 945, and therefore, a traffic redirect within the SGW which proceeds to Step 947 is determined.

Based on the policy determined in Step 609, the PCRF 12 transmits a dedicated bearer setting request to the SGW 42 which accommodates the CN 72 (610). The dedicated bearer setting request includes the user ID 231, the flow filter 232C, and the QoS/billing information.

Based on the information included in the received dedicated bearer setting request, the SGW 42 which received the dedicated bearer setting request transmits a dedicated bearer setting request to the MME 41, and sets dedicated bearers between the CN 72 and the eNB 43A and between the eNB 43A and the SGW 42 (611).

Then, the SGW 42 transmits a dedicated bearer setting reply to the PCRF 12 (612). The dedicated bearer setting reply includes the bearer ID 212 assigned to the dedicated bearer to which set by the SGW 42.

Then, based on the route optimization policy determined in Step 609, the PCRF 12 transmits an inter-bearer link creation request to the SGW 42 (613). The inter-bearer link creation request includes information of the dedicated bearer of the MN71 as the link source bearer information, and information of the dedicated bearer of the CN72 as the link source bearer information.

Based on the information included in the received inter-bearer link creation request, the SGW 42 which received the inter-bearer link creation request creates an inter-bearer link (614).

Then, the SGW 42 transmits an inter-bearer link creation notification to the MME 41 (615), and the MME 41 transmits ACK to the SGW 42 as the reply (616).

The SGW 42 transmits an inter-bearer link creation reply to the PCRF 12 (617).

With the above processing, the dedicated bearer setting processing is completed, and the traffic between the MN 71 and the CN 72 is transferred on the route of [MN 71-eNB 43C-SGW 42-eNB 43A-CN 72].

Examples of the aspects of the invention which are not described in the Claims include the following:

An access gateway installed in a communication system comprising a home server which connects a terminal and a service network, an access gateway which connects the terminal and the home server, and a policy server which controls the access gateway, wherein a first communication path is set between a first terminal and another access gateway, a second communication path is set between the another access gateway and the home server, an eighth communication path is set between the second terminal and the access gateway, and a ninth communication path is set between the access gateway and the home server;

the first terminal communicates with the second terminal via the first communication path, the second communication path, the ninth communication path, and the eighth communication path; and the access gateway manages communication path management information including information on the communication paths of each terminal, transfers a link creation request further including information on the eighth communication path to the another access gateway in the case of receiving a link creation request from the policy server, connects between the eighth communication path, and the tenth communication path, set between the access gateway and the another access gateway, based on the received link setting completion notification in the case of receiving a link setting completion notification from the another access gateway, records information on the set tenth communication path in the communication path management information, and transmits, to the second terminal via the eighth communication path, data transmitted from the other access gateway device via the tenth communication path.

What is claimed is:

1. A communication system comprising:
a home server which connects a terminal and a service network;
an access gateway which connects the terminal and the home server; and
a policy server which controls the access gateway,
wherein the access gateway includes at least a first access gateway;
wherein a first communication path is set between a first terminal and the first access gateway, a second communication path is set between the first access gateway and the home server, a third communication path is set between a second terminal and the first access gateway, and a fourth communication path is set between the first access gateway and the home server;
wherein the first terminal communicates with the second terminal via the first communication path, the second communication path, the fourth communication path and the third communication path;
wherein the first access gateway manages communication path management information including information on the communication paths of each terminal;
wherein the policy server transmits, to the first access gateway, a link creation request for associating a communication path of the first terminal and a communication path of the second terminal; and
wherein the first access gateway
sets a fifth communication path which connects the first communication path and the third communication path upon receiving the link creation request,
records information on the set fifth communication path in the communication path management information, and
transmits data from the first terminal via the first communication path to the second terminal via the fifth communication path and the third communication path based on the communication path management information;
wherein the policy server
increases the priority of the first communication path, the second communication path, the fourth communication path and the third communication path in the case where the first terminal communicates with the second terminal via the first communication path, the second communication path, the fourth communication path and the third communication path, and
decreases the priority of the first communication path, the fifth communication path and the third communication path in the case where the first terminal communicates with the second terminal via the first communication path, the fifth communication path and the third communication path; and
wherein quality of communication between the first terminal and the second terminal is controlled based on the priority of the first communication path, the second communication path, the fourth communication path and the third communication path and the priority of the first communication path, the fifth communication path and the third communication path.

2. The communication system according to claim 1, wherein the access gateway further includes a second access gateway;
wherein the second access gateway manages communication path management information of the second access gateway including information on the communication paths of each terminal;
wherein the first access gateway transmits, to the second access gateway, connection switching information including information on the first communication path and the information on the fifth communication path upon the first terminal switches a connection from the first access gateway to the second access gateway;
wherein the second access gateway sets a sixth communication path between the first terminal and the second access gateway based on the received switching information, and transmits, to the first access gateway, a setting completion notification including a notification of completion of setting the sixth communication path;
wherein the first access gateway
sets a seventh communication path between the first access gateway and the second access gateway based on the received setting completion notification and the communication path management information of the second access gateway, connects the seventh communication path and the third
communication path, records information on the set
seventh communication path in the communication
path management information of the second access
gateway, and transmits a link setting completion notification including the information on the seventh communication path to the second access gateway;

wherein the second access gateway
connects the seventh communication path and the sixth communication path based on the received link setting completion notification, records the set information on the seventh communication path in the communication path management information of the second access gateway, and transmits, to the first access gateway via the seventh communication path, data transmitted from the first terminal via the sixth communication path based on the communication path management information of the second access gateway; and wherein the first access gateway transmits, to the second terminal via the third communication path, data transmitted from the second access gateway via the seventh communication path.

3. The communication system according to claim 2, wherein the policy server does not change priority of the sixth communication path, the seventh communication path and the third communication path in the case where the first terminal communicates with the second terminal via the sixth communication path, the seventh communication path and the third communication path; and wherein quality of communication between the first terminal and the second terminal is controlled based on the priority of the sixth communication path, the seventh communication path and the third communication path.

4. The communication system according to claim 1, wherein the access gateway further includes a second access gateway;

wherein an eighth communication path is set between the second terminal and the second access gateway and a ninth communication path is set between the second access gateway and the home server;

wherein the first terminal communicates with the second terminal via the first communication path, the second communication path, the ninth communication path and the eighth communication path;

wherein the second access gateway manages communication path management information including information on the communication paths of each terminal;

wherein the policy server transmits a link creation request for associating a communication path of the first terminal and a communication path of the second terminal to the second access gateway;

wherein the second access gateway transmits a link creation request including information on the eighth communication path to the first access gateway in the case where the link creation request is received; and wherein the first access gateway
sets a tenth communication path between the first access gateway and the second access gateway based on the received link creation request and the communication path management information of the first access gateway in the case where the link creation request is received,
connects the tenth communication path and the first communication path, records information on the set tenth communication path in the communication path management information of the first access gateway, and transmits a link setting completion notification including the information on the tenth communication path to the second access gateway;

wherein the second access gateway connects the tenth communication path and the eighth communication path based on the received link setting completion notice;

wherein the first access gateway transmits, to the second access gateway via the tenth communication path, data transmitted from the first terminal via the first communication path based on the communication path management information of the first access gateway; and wherein the second access gateway transmits data received from the first access gateway to the second terminal via the eighth communication path.

5. The communication system according to claim 4, wherein an encryption key is included in the link creation request which the second access gateway transmits to the first access gateway and in a reply to the link setting completion notification which the first access gateway transmits to the first second access gateway; and wherein the first access gateway authenticates the second access gateway based on the encryption key.

6. The communication system according to claim 4, wherein the policy server does not change the priority of the first communication path, the tenth communication path and the eighth communication path in the case where the first terminal communicates with the second terminal via the first communication path, the tenth communication path and the eighth communication path; and wherein quality of communication between the first terminal and the second terminal is controlled based on the priority of the first communication path, the tenth communication path and the eighth communication path.

7. The communication system according to claim 1, wherein the link creation request includes a communication path identification for identifying created communication path;

wherein the communication path management information includes uplink communication path management information and downlink communication path management information; and wherein the access gateway, in the case of setting a fifth communication path that connects between the first communication path and the third communication path, records a communication path identification of the third communication path in the uplink communication path management information as a source of the uplink connection, and records a communication path identification of the first communication path in the downlink communication path management information as a destination of the downlink connection.

8. The communication system according to claim 1, wherein the link creation request includes a communication path identification for identifying created communication path;

wherein the communication path management information includes uplink communication path management information and downlink communication path management information; and wherein the access gateway, in the case of setting a fifth communication path that connects between the first communication path and the third communication path, records a communication path identification of the first communication path in the uplink communication path management information as a destination of the uplink connection, and records a communication path identification of the third communication path in the downlink communication path management information as a source of the downlink connection.

9. A communication system comprising:
an access gateway apparatus connected to a home server, to a terminal, and to a service network, and to a policy server which controls the access gateway apparatus,
wherein a first communication path is set between a first terminal and the access gateway apparatus;
wherein a second communication path is set between the access gateway apparatus and the home server;
wherein a third communication path is set between a second terminal and the access gateway apparatus;
wherein a fourth communication path is set between the access gateway apparatus and the home server;
wherein the first terminal communicates with the second terminal via the first communication path, the second communication path, the fourth communication path, and the third communication path; and
wherein the access gateway apparatus
manages communication path management information including information on the communication paths of each terminal,
sets a fifth communication path which connects with the first communication path and the third communication path if a link creation request is received from the policy server,
records information on the set fifth communication path in the communication path management information, and
transmits, to the second terminal via the fifth communication path and the third communication path, data transmitted from the first terminal via the first communication path based on the communication path management information;
wherein the access gateway apparatus receives Quality of Service (QoS) information from the policy server; and
wherein the QoS information
increases the priority of the first communication path, the second communication path, the fourth communication path and the third communication path in the case where the first terminal communicates with the second terminal via the first communication path, the second communication path, the fourth communication path and the third communication path,
decreases the priority of the first communication path, the fifth communication path and the third communication path in the case where the first terminal communicates with the second terminal via the first communication path, the fifth communication path and the third communication path, and
controls communication between the first terminal and the second terminal according to received QoS information.

10. The communication system according to claim 9, wherein the access gateway apparatus
transmits connection switching information including information on the first communication path and information on the fifth communication path to an another access gateway apparatus in the case where the first terminal switches a connection from the access gateway apparatus to an another access gateway apparatus,
receives setting completion information from an another access gateway apparatus,
sets a seventh communication path between the access gateway apparatus and the another access gateway apparatus based on the received setting completion notification and the communication path management information, connects the seventh communication path and the third communication path,
records information on the set seventh communication path in the communication path management information,
transmits a link setting completion notification including the information on the seventh communication path to the another access gateway apparatus, and
transmits, to the second terminal via the third communication path, data transmitted from the another access gateway apparatus via the seventh communication path.

11. The communication system according to claim 9, wherein an eighth communication path is set between the second terminal and the another access gateway apparatus, and a ninth communication path is set between the another access gateway apparatus and the home server;
wherein the first terminal communicates with the second terminal via the first communication path, the second communication path, the ninth communication path, and the eighth communication path; and
wherein the access gateway apparatus,
sets a tenth communication path between the access gateway apparatus and the another access gateway apparatus based on the received link creation request and the communication path management information in the case where a link creation request is received from the another access gateway apparatus,
connects between the tenth communication path and the first communication path,
records information on the set tenth communication path in the communication path management information,
transmits a link setting completion notification including the information on the tenth communication path to the another access gateway apparatus, and
transmits, to the another access gateway apparatus via the tenth communication path, data transmitted from the first terminal via the first communication path based on the communication path management information.

12. The communication system according to claim 11, wherein an encryption key is included in the link creation request which the another access gateway apparatus transfers to the access gateway apparatus, and in a reply to the link setting completion notification which the access gateway apparatus transmits to the another access gateway apparatus; and
wherein the access gateway apparatus authenticates the another access gateway apparatus based on the encryption key.

13. The communication system according to claim 9, wherein the link creation request includes a communication path identifier which identifies created communication path;
wherein the communication path management information includes uplink communication path management information and downlink communication path management information; and
wherein the access gateway apparatus, in the case of setting a fifth communication path that connects the first communication path and the third communication path, records a communication path identification of the third communication path in the uplink communication path management information as a source of the uplink connection, and records a communication path identifier of the first communication path in the downlink communication path management information as a destination of the downlink connection.

14. The communication system according to claim 9, wherein the link creation request includes a communication path identification for identifying created communication path;
- wherein the communication path management information includes uplink communication path management information and downlink communication path management information; and
- wherein the access gateway apparatus, in the case of setting a fifth communication path that connects between the first communication path and the third communication path, records a communication path identification of the first communication path in the uplink communication path management information as a destination of the uplink connection, and records a communication path identification of the third communication path in the downlink communication path management information as a source of the downlink connection.

15. A communication system comprising:
- an access gateway apparatus connected to a home server, to a terminal, to a service network, and to a policy server which controls the access gateway apparatus,
- wherein a first communication path is set between the first terminal and another access gateway apparatus;
- wherein a second communication path is set between the another access gateway and the home server;
- wherein a third communication path is set between second terminal and the another access gateway apparatus;
- wherein a fourth communication path is set between the another access gateway and the home server;
- wherein a fifth communication path is set for connecting the first communication path and the third communication path;
- wherein the first terminal communicates with the second terminal via the first communication path, the fifth communication path, and the third communication path;
- wherein the access gateway apparatus
  - manages communication path management information including information on the communication paths of each terminal,
  - sets a sixth communication path between the first terminal and the access gateway apparatus based on switching information received from the another access gateway apparatus in the case where the first terminal switches a connection from the another access gateway apparatus to the access gateway apparatus,
  - transmits, to the another access gateway apparatus, a setting completion notification including a notification of completion of setting the sixth communication path,
  - in the case of receiving a link setting completion notification including information on a seventh communication path set between the access gateway and the another access gateway apparatus from the another access gateway apparatus, connects the sixth communication path and the seventh communication path based on the received link setting completion notification,
  - records information on the set seventh communication path in the communication path management information, and
  - transmits, to the another access gateway apparatus via the seventh communication path, data transmitted from the first terminal via the sixth communication path based on the communication path management information;
- wherein the access gateway apparatus receives Quality of Service (QoS) information from the policy server; and
- wherein the QoS information
  - increases the priority of the first communication path, the second communication path, the fourth communication path and the third communication path in the case where the first terminal communicates with the second terminal via the first communication path, the second communication path, the fourth communication path and the third communication path,
  - decreases the priority of the first communication path, the fifth communication path and the third communication path in the case where the first terminal communicates with the second terminal via the first communication path, the fifth communication path and the third communication path, and
  - controls communication between the first terminal and the second terminal according to received QoS information.

* * * * *